United States Patent
Yamakita et al.

(10) Patent No.: US 6,525,798 B1
(45) Date of Patent: Feb. 25, 2003

(54) LIQUID CRYSTAL DISPLAY UNIT

(75) Inventors: Hiroyuki Yamakita, Oosaka (JP);
Katsuhiko Kumagawa, Neyagawa (JP); Akinori Shiota, Hirakata (JP);
Ichiro Sato, Kyotanabe (JP); Akio Takimoto, Neyagawa (JP)

(73) Assignee: Matsushita Electric Industrial Co., Ltd. (JP)

( * ) Notice: Subject to any disclaimer, the term of this patent is extended or adjusted under 35 U.S.C. 154(b) by 31 days.

(21) Appl. No.: 09/691,912

(22) Filed: Oct. 20, 2000

(30) Foreign Application Priority Data

Oct. 21, 1999 (JP) .................................. 11-299658
Oct. 21, 1999 (JP) .................................. 11-299659
Oct. 21, 1999 (JP) .................................. 11-299660
Mar. 24, 2000 (JP) .................................. 2000-084345

(51) Int. Cl.⁷ ............................................ G02F 1/1335
(52) U.S. Cl. ........................................ 349/141; 349/106
(58) Field of Search .................................... 349/141, 106

(56) References Cited

U.S. PATENT DOCUMENTS

| | | | | |
|---|---|---|---|---|
| 5,946,067 A | * | 8/1999 | Kim et al. | 349/141 |
| 5,977,562 A | * | 11/1999 | Hirakata et al. | 349/141 |
| 6,072,554 A | * | 6/2000 | Sato | 349/141 |
| 6,088,078 A | * | 7/2000 | Kim et al. | 349/141 |
| 6,128,061 A | * | 10/2000 | Lee et al. | 349/141 |
| 6,137,557 A | * | 10/2000 | Hebiguchi et al. | 349/141 |
| 6,219,115 B1 | * | 4/2001 | Nakayoshi et al. | 349/141 |
| 6,256,081 B1 | * | 7/2001 | Lee et al. | 349/141 |
| 6,266,116 B1 | * | 7/2001 | Ohta et al. | 349/141 |
| 6,266,118 B1 | * | 7/2001 | Lee et al. | 349/141 |
| 6,292,245 B1 | * | 9/2001 | Lee et al. | 349/141 |
| 6,297,866 B1 | * | 10/2001 | Seo et al. | 349/141 |
| 6,341,004 B1 | * | 1/2002 | Kondo | 349/141 |

FOREIGN PATENT DOCUMENTS

| | | |
|---|---|---|
| DE | WO 91/10936 | 1/1990 |
| JP | 63-21907 | 12/1979 |
| JP | 06160878 A | 9/1993 |
| JP | 10-148826 | 11/1996 |
| JP | 10-307295 | 4/1997 |

* cited by examiner

Primary Examiner—James Dudek
(74) Attorney, Agent, or Firm—Parkhurst & Wendel, L.L.P.

(57) ABSTRACT

A liquid crystal display unit including a plurality of pixels each including a plurality of common electrodes, a plurality of pixel electrodes, and a semiconductor switching element, a plurality of scanning signal lines, a plurality of video signal lines for outputting signals to the pixel electrodes. The display further includes an array substrate having the pixels, the scanning signal lines, and the video signal lines arranged on a surface thereof, a counter substrate arranged opposite the array substrate, and a liquid crystal layer sandwiched between the array substrate and the counter substrate, wherein each of the pixels includes a plurality of electrode pairs, each electrode pair including one of the common electrodes and an adjacent one of the pixel electrodes, and at least one of the electrode pairs differs from other electrode pairs in a thickness of its common electrode or a thickness of its pixel electrode.

7 Claims, 21 Drawing Sheets

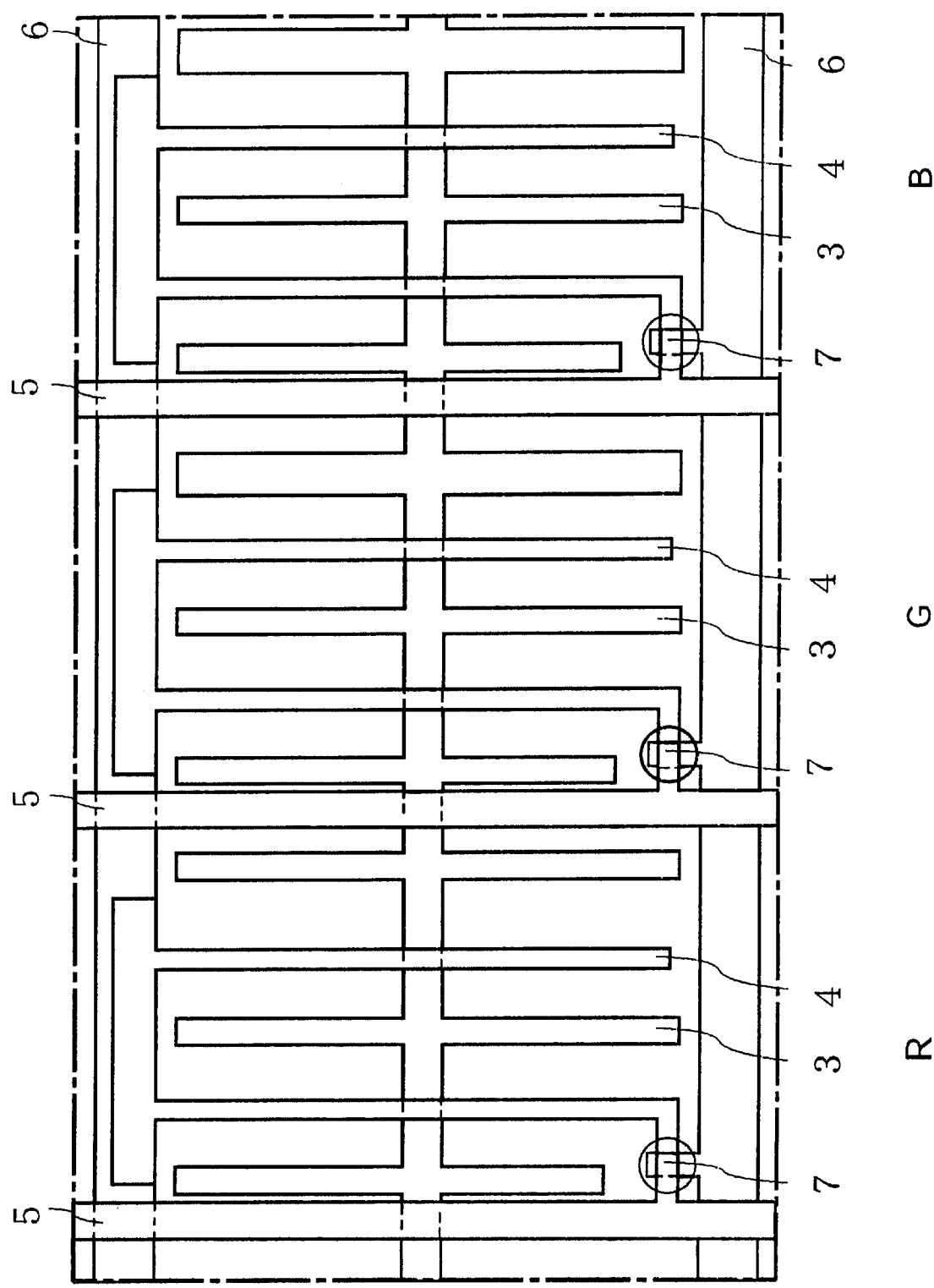

(comparative example)

(comparative example)

LIQUID CRYSTAL DISPLAY UNIT

BACKGROUND OF THE INVENTION (1) Field of the Invention

The present invention relates to a liquid crystal display unit.

(2) Description of the Prior Art

The display system of liquid crystal display unit may roughly be divided into the following two types.

One of the display systems is such a conventional system as represented by the twist nematic display mode (hereinafter referred to as "TN type"), wherein a pair of transparent electrodes are opposingly arranged on substrates different from each other to operate a liquid crystal loaded between these electrodes by applying a voltage between them.

In recent years, another system replacing the above, in which the direction of the electric field formed around the liquid crystal is made almost parallel to the substrate surface (In-Plane Switching; hereinafter referred to as "IPS type"), has been proposed in, for example, Japanese Patent Publication Sho 63-21907, WO91/10936, Unexamined Japanese Patent Publication Hei 6-160878.

FIG. 20a shows an example of the IPS type pixel.

An array substrate 1a has pixel electrodes 4 and common electrodes 3 on a upper surface thereof. A semiconductor switching element 7 consisting of thin film transistor (TFT) controls the switching-on/off of the connection between a video signal line 5 and a pixel electrode 4 by a signal from the scanning signal line 6. A gate insulator film 11 prevents the short-circuiting between the common electrode 3 and the video signal line 5. The protective insulator film 12 protects the semiconductor switching element 7. A liquid crystal layer 2 is formed in the space between the array substrate 1a and counter substrate 1b. When the semiconductor switching element 7 turns on, a voltage is applied between the pixel electrodes 4 and common electrodes 3. Consequently, an electric field is produced between the adjoining pixel electrode 4 and common electrode 3 to activate the liquid crystal in the liquid crystal layer 2.

According to this system, a far wider viewing angle than that of the TN type can be obtained.

However, the IPS type display system has such problematical points as follows.

The IPS type has a problem of "coloring" in which the apparent tone of color varies depending upon the direction of visual angle, that is, the color is seen blue when viewed from the angle of the longer axis of the liquid crystal molecule, and it is seen red if viewed from the direction of the shorter axis, although it actualized a wider viewing angle. This being due to the anisotropy of refractive index peculiar to the liquid crystal, it often elicits the troubles at the time of bright state display (at the time of voltage application in the normally black mode).

Another problematic point for the IPS type is that the after image is more likely to occur. This image retention is thought to be due to the occurrence of ionic polarization in liquid crystal phase, because of the asymmetric distribution of the electric field formed between the pixel electrode and common electrode.

Furthermore, a transmittance-voltage curve (hereinafter referred to as "T-V curve") of the IPS type display unit is steeper than that of the conventional TN type, and consequently it is difficult to control the tone.

Besides, the IPS type color liquid crystal display unit also has a problem in that a light use efficiency is low. Generally, the color display is enabled by using red, green, or blue color filter for each pixel. As shown in FIG. 19, the transmittance of color filter depends on each color. Since a wavelength distribution of a light source is not uniform, if the same voltage is applied on each pixel under such state, luminance of respective colors will become divergent, thereby prohibiting the displaying of any achromatic color. Because of this inconvenience, the conventional filters was so designed that the voltage to be applied should be corrected according to each color, or that the transmittance of the filter at each color should coincide with each other, while retaining the applied voltage to be the same. The voltage correction requires the matching of light intensity with the darkest color. Meantime, according to the design of filter transmittance, it is required to reduce the transmittance of any one of the filters. Specifically, in the case of so-called reflection type liquid crystal display unit, the light inevitably passes twice through the color filter, and therefore it has become very difficult to set the chromatic purity and transmittance of the filter.

SUMMARY OF THE INVENTION

The object of the present invention is to solve the foregoing problems and to provide a liquid crystal display unit with fast-response, a high light use efficiency, little image retention, and a wider viewing angle.

The liquid crystal display according to the present invention has:

plural pixels each includes common electrodes, pixel electrodes and a semiconductor switching element;

scanning signal lines; video signal lines for outputting a signal to the pixel electrode;

an array substrate on which the plural pixels, the scanning signal lines, and the video signal lines are arranged;

a counter substrate opposingly arranged to the array substrate; and a liquid crystal layer sandwiched between the array substrate and the counter substrate, wherein at least one of the electrode pairs consisting of a set of the common electrode and the pixel electrode or at least one of the electrodes has a different geometrical shape from others.

The IPS type liquid crystal display unit of the present invention, where the common electrodes and pixel electrodes are alternately arranged in a row on the same substrate, concomitantly uses the electrode pairs different in geometrical shape from other electrode pairs, or the electrodes different in geometrical shape from other electrodes.

The present invention includes a case where the electrodes or electrode pairs different in geometrical shape from each other coexist in the same pixel, and another case where the pixels different from each other in the configuration of the electrodes or electrode pairs coexist.

The geometrical shape of the electrode in the present invention includes the width and thickness of the electrode. For example, the pixel electrodes different in the width or thickness from the common electrodes are used. The present invention also includes a case where the common electrode different in the width or thickness from other common electrodes is employed, and another case where the pixel electrode different in the width or thickness from other pixel electrodes is employed.

The geometrical shape of the electrode pair in the present invention includes a gap between the both electrodes which constitute an electrode pair.

The combined use of the common electrodes and pixel electrodes of different width and thickness in the same pixel enables a formation of an electric field distribution which is symmetrical on the axis of the center line of the both electrodes, between these electrodes, and enables to suppress the occurrence of image retention.

If a region, where the geometrical shape of the electrode pairs is different from that of other electrode pairs, is locally provided in the same pixel, the plural electric field distributions, that are different in geometrical shape from each other, will be formed. Consequently, the plural are as that are different in the direction of the director of the liquid crystal molecule from each other will be formed in the pixel. Since the coloring in these areas cancels each other out, it is possible to widen the viewing angle of the display unit. Particularly, it is more effective to arrange such electrode pairs that constitute the electric fields consisting mainly of vertical components. To effectively construct the electric fields, which are vertical in direction, it is desired to make the electrode width or the gap between the common electrode and pixel electrode not larger than the gap between the array substrate and counter substrate. It is also useful to provide other electrodes on the counter substrate. Preferably, the potential of the electrodes thus newly provided shall be made equivalent to that of the common electrode.

The coexistence of the electrode pairs with different electrode gaps contributes further to the enhancement of fast response. This is because the molecules of liquid crystal corresponding to the electrode pairs with wider gap follow the liquid crystal molecules corresponding to the electrode pairs with narrower gap that respond more quickly. This also makes it possible to suppress the image retention. For instance, it can be made possible to approximate the geometrical form of the electric field distribution formed between both electrodes to symmetry by providing broader electrodes to the regions more susceptible to the influence of the potential of surrounding wiring.

A useful method to use the pixels where the electrodes or electrode pairs are different in geometrical shape from each other is to use the pixels having their own electrode configuration corresponding to respective display colors. The geometrical shape of the electric field distribution generated on the electrode pair depends on the geometrical shape of the electrode pair. Consequently, if the geometrical shape of the electrode pair is changed, the wavelength dispersion characteristic of the liquid crystal layer will also be changed. Therefore, the geometrical forms of the electrode pair such as the electrode gap, electrode width, and electrode thickness shall be set so that the wavelength, at which the light passing through the liquid crystal layer manifests its peak, can be close to the wavelength at which the color filter of respective colors R, G, and B manifests its peak transmittance. This provides highly efficient use of light as well as a high luminance. Since each pixel suited to each display color can be obtained by making the pixel of each color have its own electrode configuration, it becomes easier to set the chromatic purity and transmittance of the filter of which degree of freedom was conventionally low. A coexistence in a pixel of the electrodes or electrode pairs different in geometrical shape from each other may endow the T-V characteristic of the pixel with tonality. Making the T-V characteristic smoother contributes to a display with a higher tonality.

According to the present invention, since the spectral transmittance characteristic of liquid crystal layer can be controlled in due consideration of the wavelength distribution of light source and the wavelength dependability of transmittance of the color filter, a pixel with more excellent tone can be obtained.

As shown in FIG. 22, when curved electrodes (hereinafter referred to as "angular-shaped electrodes") are used as the common electrode 3 and pixel electrode 4, the electrodes different in the angle θ (hereinafter referred to as "angle of bend") from each other shall be used in combination. Such angular-shaped electrodes have a geometrical shape in which a pair of linear electrode portions are linked at the end of each other. Therefore, since the electric field distributions of different geometrical shapes are formed in the areas A and B in the figure, the coloring in both areas will canceled each other. When the angle of bend is different between electrodes that constitute an electrode pair as in the present invention, the geometrical shape of distribution of the electric field formed at each region in the same area differs from each other, and therefore, such configuration of the present invention is more effective for suppressing the coloring. To prevent a decrease in an aperture ratio, that is to decrease an area of shield portions shared by black matrix, it is desirable to use the electrodes smaller in the angle of bend than that of other electrodes in the place near the video signal lines, for instance. More preferably, the difference of the angle of bend shall not be greater than 10 degrees.

In the case where the angular-shaped electrodes are to be used for the common electrode and pixel electrode, the angle of bend of the electrodes included in the pixel for red color display will preferably be larger than those of the electrodes included in the pixel for displaying other colors.

The present invention is not limited to so-called transmission-type liquid crystal display unit but also be applied to so-called reflection-type liquid crystal display unit provided with a reflection part, which is intended to reflect the incident ray from the exterior.

According to the present invention, desired electric field distribution can be produces on the electrode pair by combining a part of the electrodes or electrode pairs different in the geometrical shape (that is, electrode gap, electrode width and electrode thickness) from others depending on respective purposes such as coloring offset, larger aperture ratio, faster response. Because the minimum width and working accuracy of the pixel electrode and common electrode differs depending on the configuration of the pixel, electrode material, process conditions, etc., it is necessary to discuss the electrode configuration in due consideration of these factors. To cancel each coloring, for example, priority should be given to the setting of the angle of bend of the electrode. To have a larger aperture, the first priority should be given to the setting of such an electrode width that the finest line can be manifested in the manufacturing process of the electrode, and then setting should be made to set the electrode gap larger. For the faster response, priority should be given to such a setting of the electrode thickness that will enable the thickest film in the manufacturing process, and the electrode gap should be set narrower. However, note that the present invention renders the degree of design freedom significantly higher than conventional one.

BRIEF DESCRIPTION OF THE DRAWINGS

FIG. 1a is a longitudinal sectional view of the purview of a liquid crystal display unit according to one embodiment of the present invention, while

FIG. 6 is a plan view showing a purview of an array substrate of yet another embodiment of a liquid crystal display unit of the present invention.

FIG. 7a is a plan view showing a purview of an array substrate of still another embodiment of a liquid crystal display unit of the present invention, while

FIG. 8a is a plan view showing a purview of an array substrate of yet another embodiment of a liquid crystal display unit of the present invention, while

FIG. 9a is a plan view showing a purview of an array substrate of still another embodiment of a liquid crystal display unit of the present invention, while

FIG. 10a is a plan view showing a purview of an array substrate of yet another embodiment of a liquid crystal display unit of the present invention, while

FIG. 13a is a longitudinal sectional view showing a purview of still another embodiment of a liquid crystal display unit of the present invention, while

FIG. 14a is a longitudinal sectional view showing the purview of yet another embodiment of a liquid crystal display unit of the present invention, while

FIG. 15a is a longitudinal sectional view showing a purview of still another embodiment of a liquid crystal display unit of the present invention, while

FIG. 16a is a longitudinal sectional view that showing a purview of yet another embodiment of a liquid crystal display unit of the present invention, while

FIG. 20a is a plan view showing a purview of an array substrate of a conventional liquid crystal display unit, while

FIG. 21a is a plan view showing a purview of an array substrate of a comparative example of a liquid crystal display unit, while

DESCRIPTION OF THE PREFERRED EMBODIMENTS

Figure 1A:
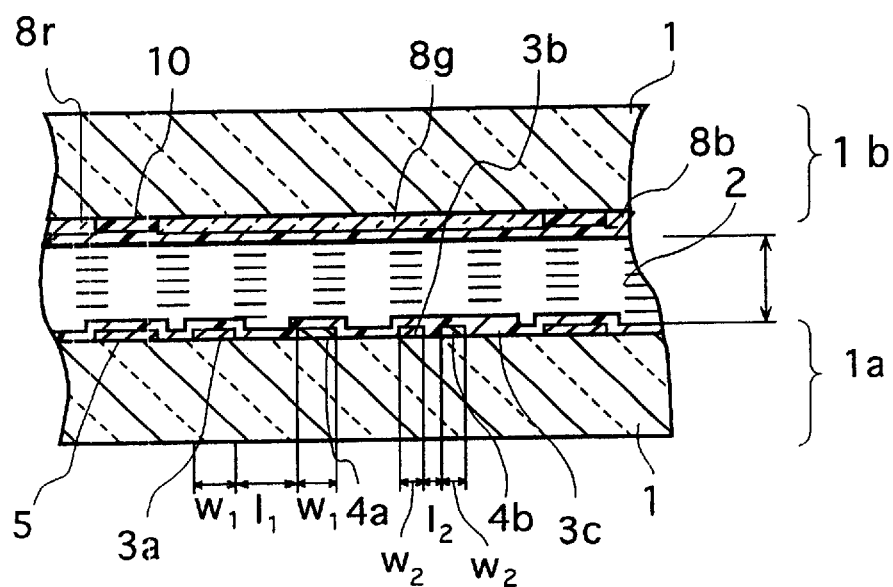

Referring to the drawings attached hereto, the preferred embodiments of the present invention are explained in more detail as the following.

EMBODIMENT 1

Figure 1B:
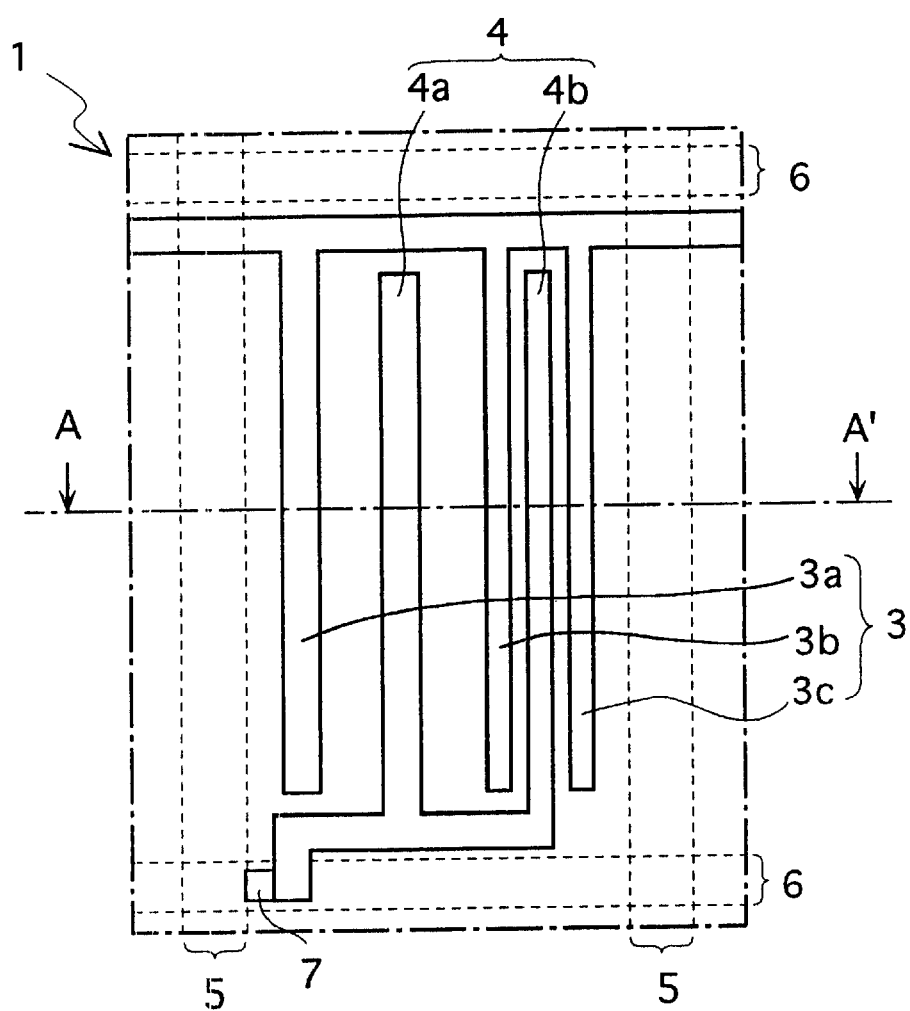
FIG. 1b represents a plan view showing a purview of a array substrate of the same unit.

FIGS. 1a and 1b show the purview of the liquid crystal display unit according to this embodiment.

Described below is the manufacturing procedure and operation of the relevant unit.

First, a film made of a conductive material such as aluminum is formed on a transparent substrate 1, and then the obtained film is patterned to make a scanning signal line 6. Next, an insulating film (not shown) is formed thereon. Further, a semiconductor switching element 7 made of a-Si, etc. and a video signal line 5 are formed so as to obtain an array substrate 1a. In the same manner as in the case with the scanning signal line 6, the video signal line 5 is formed by patterning the film made of the conductors such as aluminum.

A common electrode 3 and a pixel electrode 4 are formed by patterning a transparent conductive film made of indium-tin oxide (hereinafter referred to as "ITO") or a film made of the conductive materials such as aluminum into comb-like shape.

Formed into a predetermined pattern on the surface of other transparent substrate 1 are the red color filter 8r, green color filter 8g, blue color filter 8b and black matrix 10, and the counter substrate 1b can be obtained.

Formed respectively on the array substrate 1a and counter substrate 1b are the alignment layers 9a and 9b made of polyimide to line up the arrangement of the liquid crystal molecules in a liquid crystal layer 2 sandwiched between the both substrates. Alignment layers 9a and 9b are processed to determine the initial alignment direction of the liquid crystal in the liquid crystal layer 2 into the prescribed direction.

The array substrate 1a and counter substrate 1b thus processed are arranged so that the formed faces of the alignment layers 9a and 9b should be opposed against each other with a prescribed gap between them.

The peripheral portion of a pair of the substrates 1a and 1b is sealed up except the aperture intended for injecting the liquid crystal into the space formed between the both substrates. The opening will be sealed up after injecting the liquid crystal between the substrates 1a and 1b from this opening thereby forming the liquid crystal layer 2. As the liquid crystal, a positive liquid crystal having positive dielectric anisotropy is employed.

A semiconductor switching element 7 is controlled for switching on/off by the signal coming from the scanning signal line 6. When the semiconductor switching element 7 is turned on, the pixel electrode 4 and video signal line 6 are electrically connected with each other, and a voltage is applied between the pixel electrode 4 and common electrode 3 that are adjoining to each other thereby forming an electrode pair. The electric field thus formed between the both electrodes changes the alignment of the liquid crystal molecules in the liquid crystal layer 2, the luminance of each pixel controlled, and an image can be displayed.

The present embodiment has set, as shown in Table 1 below, the electrode pair consisting of the common electrode 3a and pixel electrode 4a (hereinafter referred to as "electrode pair A") as well as the electrode pair consisting of the common electrode 3b or 3c and pixel electrode 4b (hereinafter referred to as "electrode pair B") shown in FIG. 1. That is, the width ($W_1$) of the common electrode 3a and pixel electrode 4a has been made larger than the width ($W_2$) of the common electrode 3b and 3c and pixel electrode 4b, and further, the gap ($I_1$) between the common electrode 3a and pixel electrode 4a was made larger than the gap ($I_2$) between the common electrode 3b or 3c and the pixel electrode 4b.

TABLE 1

| Electrode pair | Gap ($\mu$m) | Width ($\mu$m) | Cell gap "d" ($\mu$m) |
| --- | --- | --- | --- |
| A | 10 | 6 | 4 |
| B | 4 | 4 | |

Electric field distributions different in geometrical shape from each other are formed on the electrode pairs A and B. Naturally, electric field distribution different from those of the electrode pairs A and B will be formed on the electrode pair consisting of the common electrode 3b and pixel electrode 4b as well.

If, therefore, the electrode gap and electrode width is larger than the cell gap shown as "d" in the figure as in the case of the electrode pair "A", a horizontal electric field, of which vector is, in principle, parallel to the surfaces of the substrates 1a and 1b, is formed between both electrodes. However, note that the electrode gap and electrode width grows smaller against the cell gap, the vertical components perpendicular to the substrate surface will relatively grow larger. Particularly, if the electrode gap and electrode width are both smaller than the cell gap, as in the case of electrode pair "B", the vertical components occupy a larger proportion.

The liquid crystal molecules in the electric field are aligned so that the axes thereof run along the vector of the electric field. In an area corresponding to the electrode pair "B" in the liquid crystal layer 2, most of the liquid crystal molecules will be aligned in the direction, in which their axes are inclined from the substrate face, not like the case of the other areas. Therefore, the liquid crystal in the area of the electrode pair "B" will manifest a director different from the case of the other areas. Consequently, it results in that the area of the electrode pair "B" manifests such wavelength dispersion characteristic different from that of the electrode pair "A" (namely, characteristic of different coloring).

Figure 2:
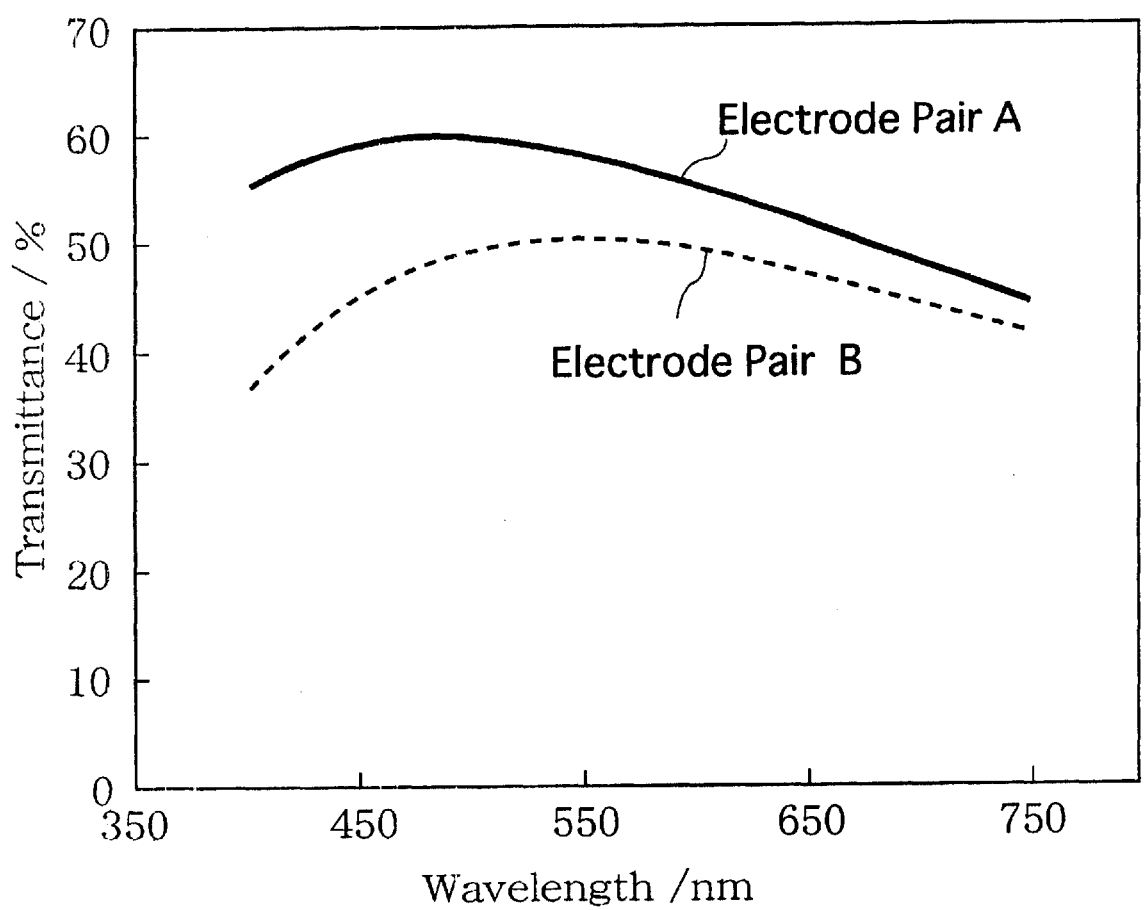
FIG. 2 is a characteristic diagram showing a relationship of a geometrical shape of an electrode pair with a wavelength dispersion characteristic of a pixel.

FIG. 2 shows a wavelength dispersion characteristics of the electrode pairs "A" and "B" as viewed from the front side. These belong to the case where the phase difference $\Delta n \cdot d$ ($\Delta n$: differential refractive index of liquid crystal; d: cell gap) is so adjusted that a peak transmittance can be obtained at the wavelength of approximately 550 nm in the area of the electrode pair "A". Under these conditions, the peak transmittance is shown at the wavelength of approximately 480 nm in the area of the electrode pair "B". Thus, in the areas of the electrode pair "A" and electrode pair "B" of which electrode width and gap are different from each other, the liquid crystals manifest the directors different from each other, even though the drive voltage, cell gaps, liquid crystal material, and other conditions are quite the same, and the respective areas will reveal their peculiar color change characteristics.

As has been described above, the combined use of an electrode pair of different configuration enables to cancel the coloring which occurs in each area. Therefore, this makes it possible to have a liquid crystal display unit with little coloring due to the changes in the direction of visual angle as well as an excellent picture quality.

The coloring offset will be more effective if a transparent conductor such as ITO as the electrode pair is used, because in this case the area occupied by the electrodes can be used as the display area.

If the electrode gap is made narrower, the intensity of the electric field formed between the both electrodes becomes higher, which in turn will make sharper the rising time characteristics. The response time of the liquid crystal molecule activated by the electrode pair "B" is shorter than that of the liquid crystal molecule corresponding to the electrode pair "A" of conventional configuration. In the pixel in which the electrode pairs "A" and "B" coexist, the liquid crystal molecule activated by the electrode pair "A" behaves as if to follow the liquid crystal molecule of the electrode pair "B" that makes quick response. Therefore, the pixels with coexisting electrode pairs "A" and "B" can respond faster than the pixels having only the electrode pairs of an intermediate configuration between the electrode pairs "A" and "B" (for example, electrode gap of 7 $\mu$m, electrode width of 5 $\mu$m).

An optimization of the proportion of the number of the electrode pairs A and B corresponding to the pixel size enables to adopt a design with a larger aperture ratio than in any conventional configuration.

EMBODIMENT 2

Figure 3A:
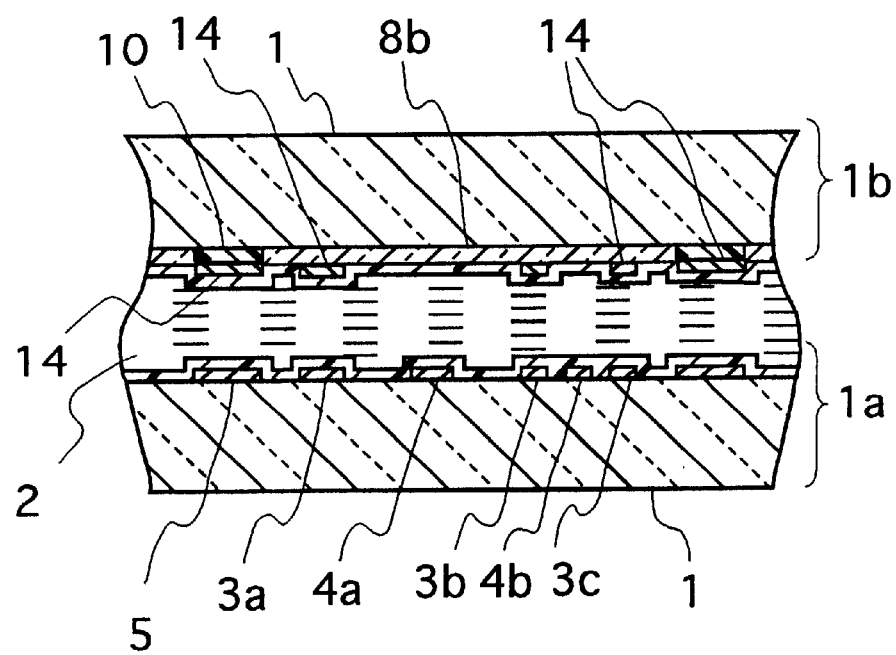
FIG. 3a is a longitudinal sectional view showing a purview of another embodiment of a liquid crystal display unit of the present invention, while both

FIG. 3a shows a purview of a liquid crystal display unit of this embodiment. The array substrate 1a is the same as that in the Embodiment 1. On the other hand, a counter electrode 14 is provided on a face of the opposed side of the substrate against the array substrate 1a. A potential of the counter electrode 14 is equivalent to that of common electrodes 3a, 3b and 3c. The counter electrode 14 is arranged at the position opposed to a video signal line 5 and common electrodes 3a, 3b and 3c, respectively.

Figure 3B:
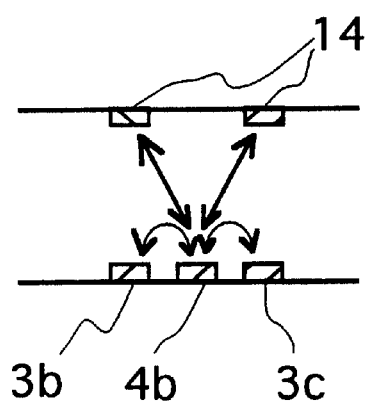
FIG. 3b and FIG. 3c are the schemes showing an electric field distribution formed between electrodes in the same display unit.
Figure 3C:
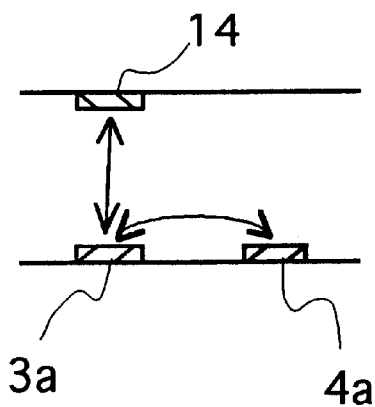

In this display unit, an electric field is formed between a pair of the electrodes, namely, the common electrode 3a, 3b or 3c and pixel electrode 4a or 4b, and electric field is formed between the counter electrode 14 and pixel electrode 4a or 4c as well. As shown in FIG. 3b and FIG. 3c, the vector of the electric field formed between the common electrode 3a, 3b or 3c and pixel electrode 4a or 4b faces toward an almost horizontal direction, while that of the electric field formed between the counter electrode 14 and pixel electrode 4a or 4b faces toward the vertical direction, that is, the direction that runs across a liquid crystal layer 2.

Therefore, the distribution of the electric fields conspicuously differs in the area corresponding to the electrode pair "A" (common electrode 3a and pixel electrode 4a) and the area corresponding to the electrode pair "B" (common electrode 3b and pixel electrode 4b). Consequently, in the areas corresponding respectively to the electrode pairs "A" and "B", the liquid crystals in the liquid crystal layer 2 manifest directions that are different from each other. Therefore, any coloring occurred in these areas are canceled each other.

EMBODIMENT 3

In this embodiment, we explain the improved electrode pairs suited to a color display by using the same methodology as adopted in the Embodiment 1.

The electrode pairs "C", "D" and "E", of which electrode width and gap of electrodes 3 and 4 differ each other as shown in Table 2 below, as well as their respective pixels, were produced in the pixel of the same configuration as in FIG. 1, and their T-V characteristics was examined.

TABLE 2

| Electrode Pair | Electrode Width ($\mu$m) | Electrode Gap ($\mu$m) |
|---|---|---|
| C | 4 | 8 |
| D | 6 | 6 |
| E | 8 | 4 |

Figure 4:
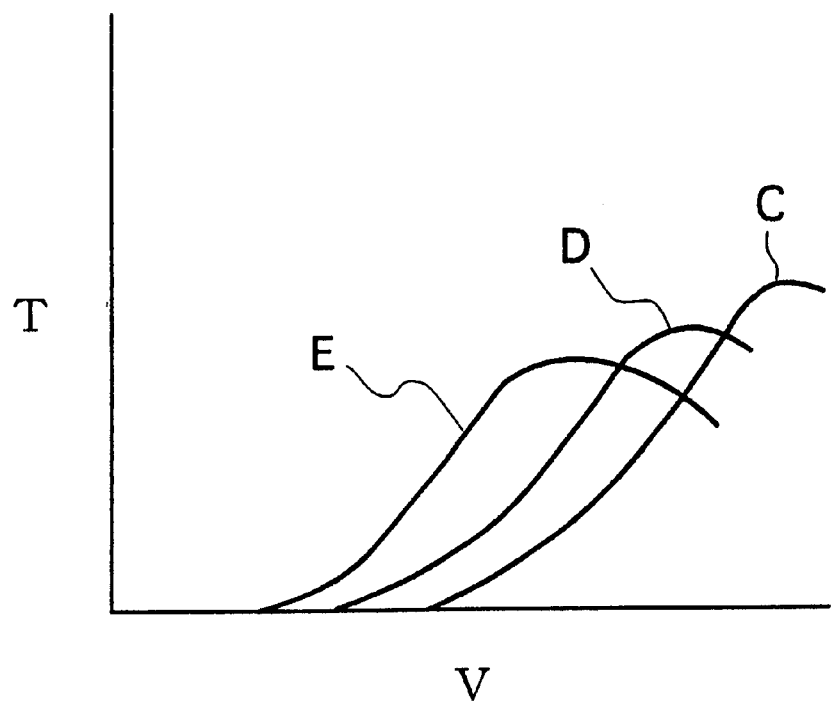
FIG. 4 is a characteristic diagram showing a transmittance-voltage curve of a pixel using electrodes different in geometrical shape from each other.

FIG. 4 shows the results of this examination. As is clear from the figure, the T-V characteristic changes remarkably when the electrode width or gap changes. This is because the distribution of the electric field formed between the electrodes varies as the electrode width or gap varies.

Figure 5:
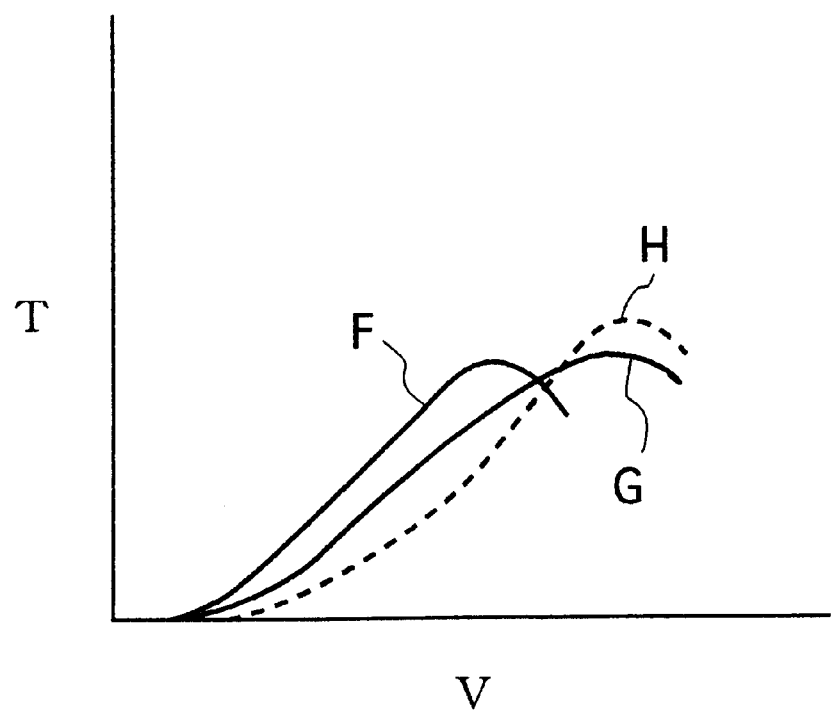
FIG. 5 is a characteristic diagram showing a transmittance-voltage curve of a pixel using electrodes different in geometrical shape from each other, and a transmittance-voltage curve that composes the former.

If the electrode pair "F" with narrow electrode gap and electrode pair "G" with broad electrode gap in the same pixel coexist as shown in FIG. 5, the pixel unit reveals a smooth and gray-scaled T-V characteristics as shown by "H" in the figure. This means that the coexistence of the plural electrode pairs of different electrode gaps in the same pixel enables to control the T-V characteristics of the pixel. By means of this, it becomes possible to endow each pixel of each color with desired T-V characteristics, which in turn makes it possible to configure γ-corrected pixel for each pixel of each color.

Therefore, the configuration of the pixel in which plural electrode pairs of different geometric shapes coexist renders it possible to correct the light intensity and γ-characteristics according to each color, thereby actualizing a bright liquid crystal display unit with a high color reproducibility.

For instance, a pixel of different electrode configuration is used according to each display color as shown in FIG. 6. In the case of the pixel for red display as shown at the left side in the figure, the electrode gap is wider and electrode width is narrower than those of other colors. In the pixel for green display as shown at the center in the figure, several types of the electrode pairs different in the electrode gap and width from each other are arranged in the same pixel. Note that the common electrode 3 and scanning signal line 6 in the figure were formed at the same time.

Use of so-called angular-shaped electrodes as the electrodes 3 and 4 enables to reduce the coloring due to viewing angle.

Further, such pixels as above will be more effective if used for so-called reflection-type liquid crystal display unit. Because, generally, the light passes twice through color filter in the reflection-type liquid crystal display unit, it is difficult to suitably set a chromatic purity and transmittance of the color filter. If some regions are made to coexist that are different in the electrode gap and width from others in the same pixel as in the present invention, differing T-V characteristics can be designed according to respective colors. Therefore, the present invention heightens the degree of freedom for setting the chromatic purity and transmittance of the filter.

Figure 7A:
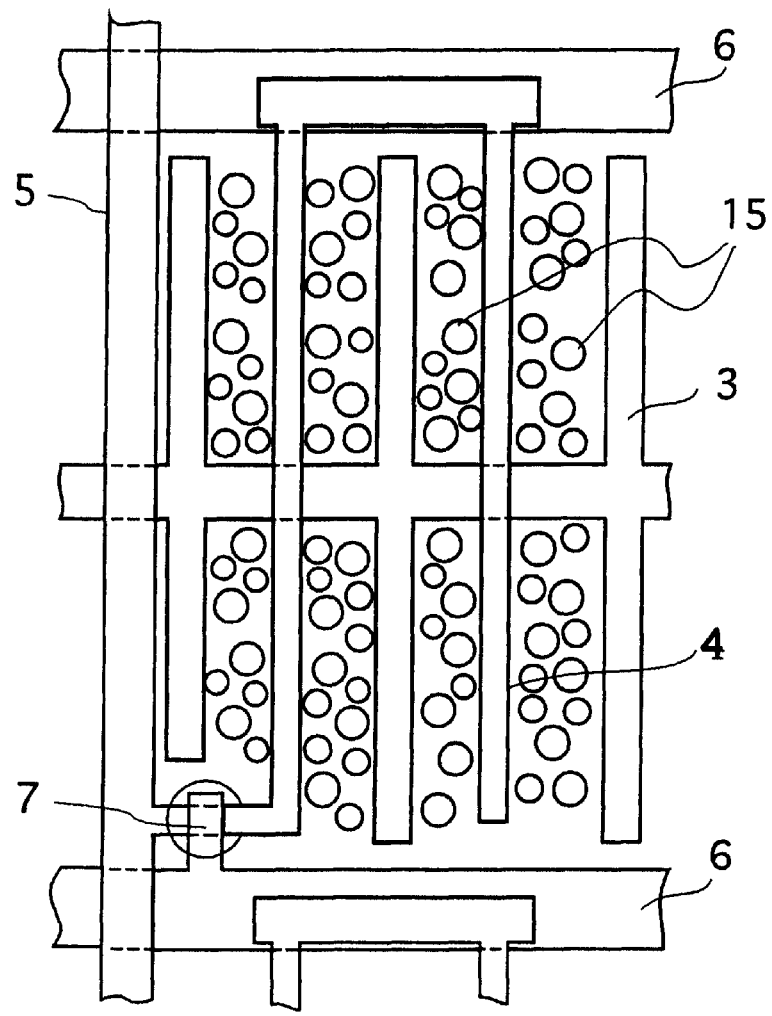
Figure 7B:
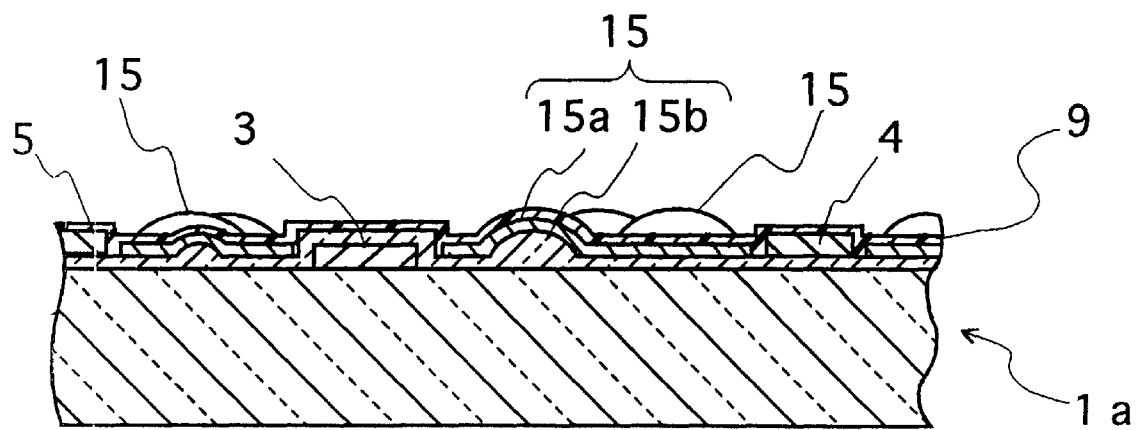
FIG. 7b is a longitudinal sectional view of a purview of the same unit.

FIG. 7*a* and FIG. 7*b* show an example where the present invention is applied to the reflection-type liquid crystal display unit. In this liquid crystal display unit, a reflective portion 15 is formed on a surface of the opposed side of an array substrate 1*a* against a liquid crystal layer 2. The reflective portion 15 consists of a hemispherical convex portion 15*a* and reflective film 15*b*. The convex portion 15*a*, which scatters the reflected light, is made, for instance, by photolithography technique the upper face of the film, which is formed as being made of transparent resin. After forming up the convex portion 15*a*, the film made from such a highly reflective metal as aluminum and silver is formed into a prescribed shape to obtain the reflective film 15*b*. This reflective portion 15 contributes to the realization of a reflection-type liquid crystal display unit without directivity, but with a broader viewing angle.

Note that the pixel electrode 4 and common electrode 3 may be such electrodes as the one that have a function to reflect light.

The form and installation site of the reflective portion is not limited in any particular way, and publicly known art can be applied there.

EMBODIMENT 4

In this embodiment, an attempt is made to explain an exemplary method which uses electrode pairs consisting of common electrode and pixel electrode which are different in geometrical shape from each other. This methodology is particularly useful in the suppression of the after image.

This embodiment involves an enhancement of the symmetry of the electric line of force built up between the common electrode and pixel electrode by changing their width.

Figure 8A:
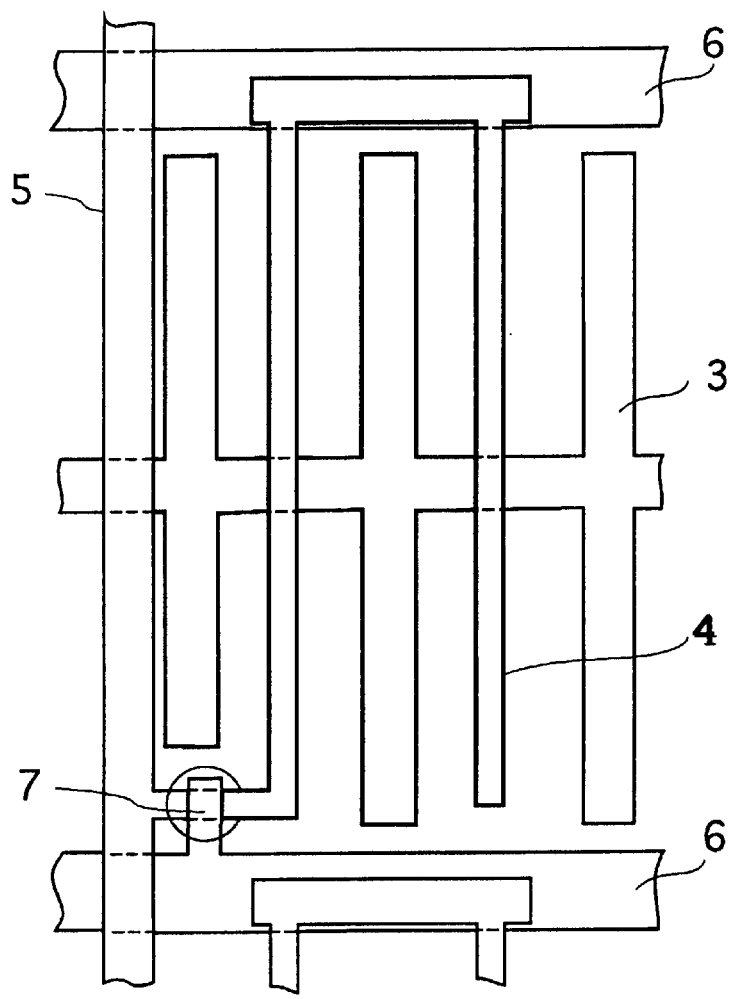
Figure 8B:
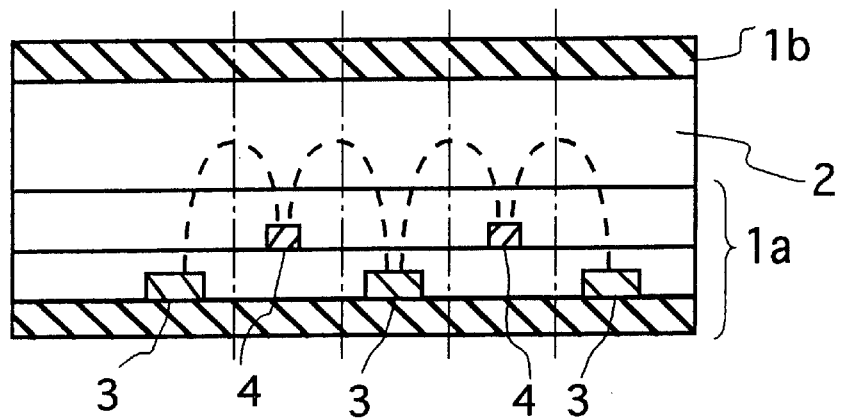
FIG. 8b is a longitudinal sectional view of a purview of the same unit.

FIG. 8*a* and FIG. 8*b* show the pixels of the liquid crystal display according to this embodiment.

Figure 20A:
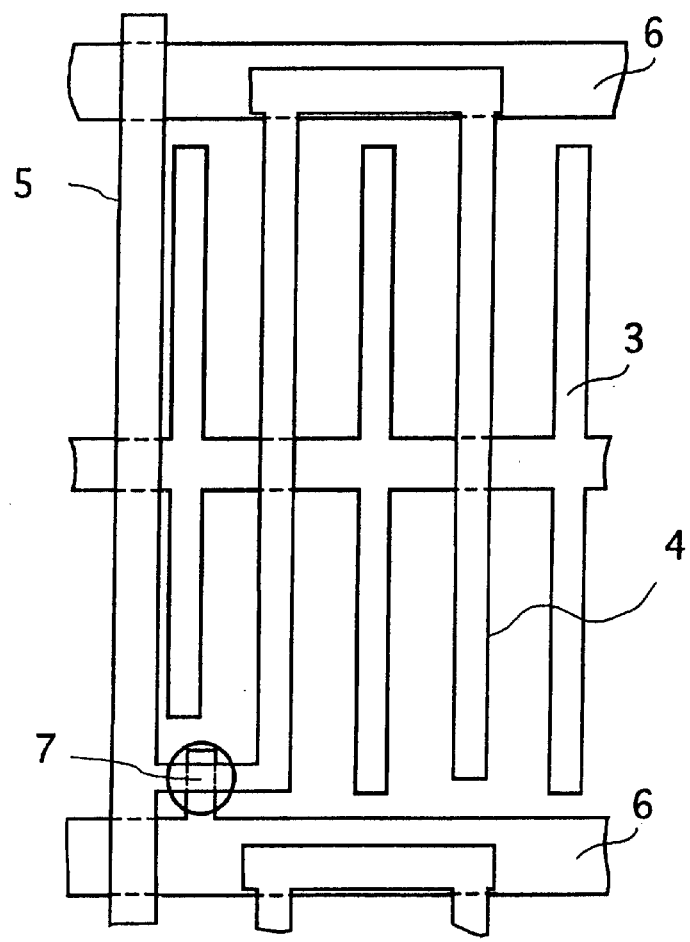
Figure 20B:
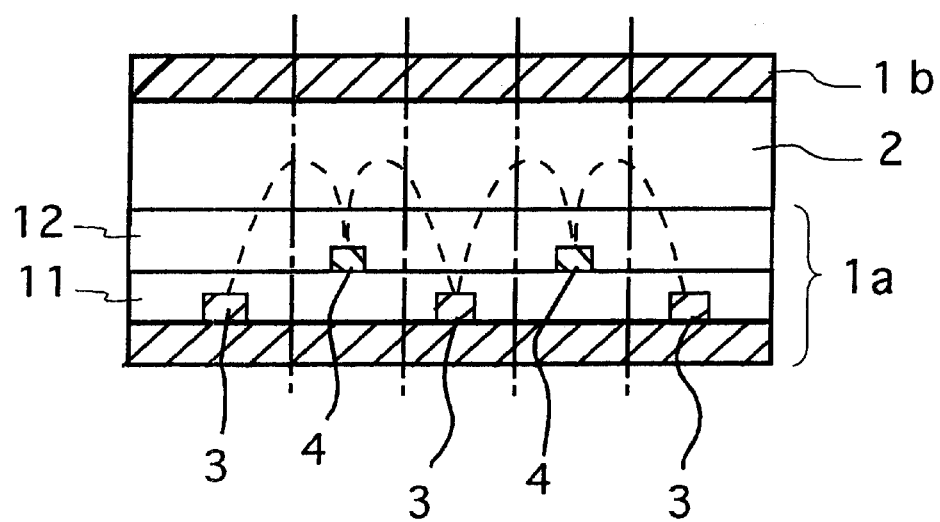
FIG. 20b is a longitudinal sectional view of a purview of the same unit.

Since, in this unit, common electrode 3 and pixel electrode 4 are constructed from differing layers, the distance from the common electrode 3 to the liquid crystal layer 2 differs from the distance between the pixel electrode 4 and liquid crystal layer 2. Therefore, an electric field formed between the pixel electrode 4 and common electrode 3 is subject to the influence of surrounding configuration, for instance, thickness, quality, dielectric constant, and differential film constitution of the gate insulator 11. If, therefore, the width of the pixel electrode 4 is the same with that of the common electrode 3 as in the conventional liquid crystal display unit shown in FIG. 20*a* (herein after referred to as "comparative example 1"), the distribution of the electric field formed between pixel electrode 4 and common electrode 3 as shown in FIG. 20*b* will become asymmetric on the axis of the center lines between the both electrodes as shown by the alternate long and short dash lines in the figure. This is due to the refraction of the electric line of force and the voltage loss by the insulating films 11 and 12. On the interface between the insulating layer near the common electrode 3 and the liquid crystal near the pixel electrode 4, the distribution of the electric field to be formed is asymmetric, and the density of the electric line of force (namely, the intensity of electric field) is different. Consequently, the space between the pixel electrode 4 and common electrode 3 falls into a state as if a DC voltage were applied, where an ionic polarization occurs within the liquid crystal layer 2 thereby producing an after image.

In this embodiment, therefore, the distribution of the electric field (namely, the geometrical shape of the electric line of force) can be brought nearer to the symmetry by making the common electrode 3 thicker than the pixel electrode 4, because the distance from the common electrode 3 to the liquid crystal layer 2 (thickness of the insulating layer) is longer than the distance between the pixel electrode 4 and the liquid crystal layer 2.

That is, if such electrode arrangement as shown in FIG. 8*a* is adopted, the geometrical form of the electric line of force becomes symmetric on the interface between the insulating layer near the common electrode 3 and the liquid crystal near the pixel electrode 4. Further, the densities of the electric line of force (intensity of the electric field) on the interface between the insulating layer near the common electrode 3 and the liquid crystal near the pixel electrode 4 become almost equal to each other, consequently making the ionic polarization hardly occur in the liquid crystal layer 2. Therefore, it becomes easier to suppress the image retention than when using the electrode pairs of which width is equal to each other.

Since, naturally, the optimal electrode width varies depending on the constitution of the insulating film, the electrode configuration in the pixel, etc., which should be thickened will not be limited.

EMBODIMENT 5

In this embodiment, an explanation is made on how the symmetry of the electric field formed on the electrode pair is improved, with provision in the same pixel of the common electrodes different in width from each other for the purpose of suppressing the image retention like the case with Embodiment 4.

The asymmetry in the distribution of the electric field formed on the electrode pairs may result also from some factors other than those shown in the Embodiment 4.

The liquid crystal in the marginal portion of the pixel is susceptible to an influence of a potential of a video signal line 5, because this line is provided in the vicinity of the video signal line 5. This influence is maximal when a potential of an input signal to a pixel electrode 4 is half tone.

Further, as the number of the pairs of the pixel electrodes 4 and common electrodes 3 increases, the electric field between the electrodes at the central portion of the pixel may be formed more effectively than between the electrodes in the peripheral portion of the pixel (in the vicinity of the video signal line 5), and the electric field at the center of pixel is therefore more intense.

Figure 21A:
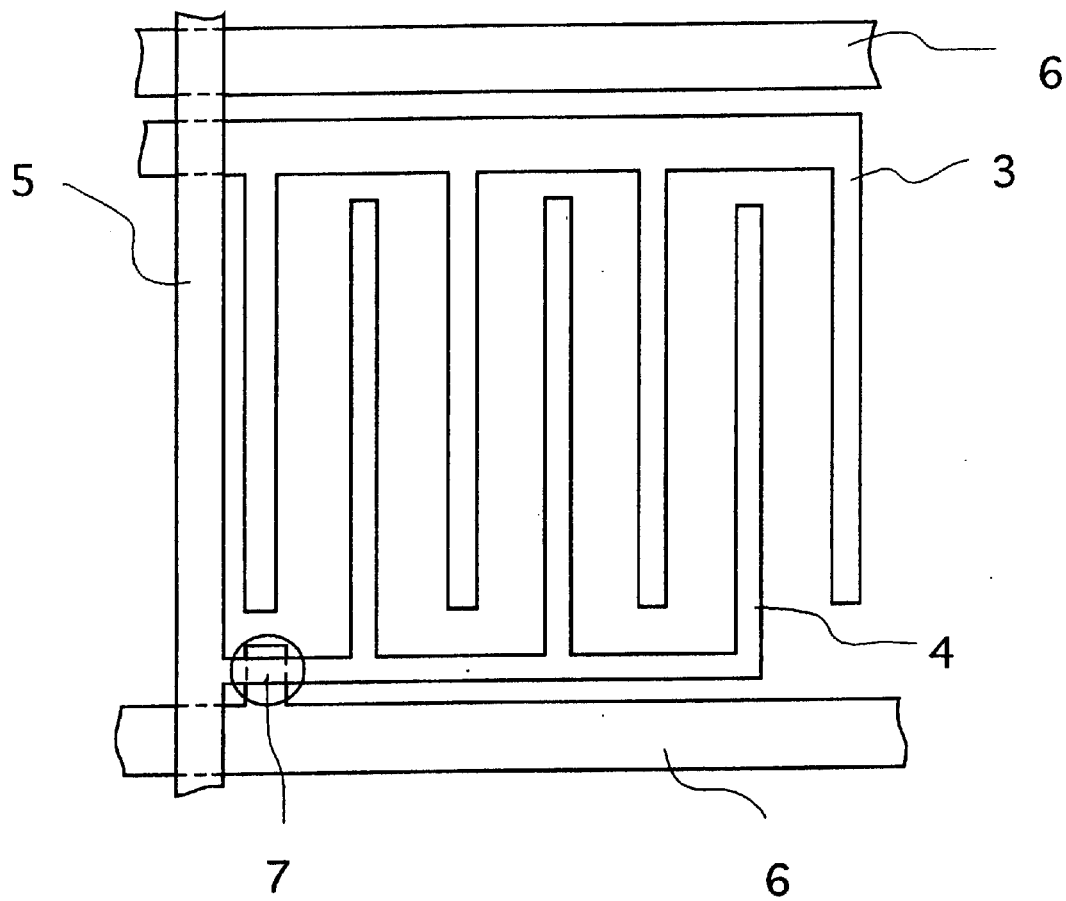
Figure 21B:
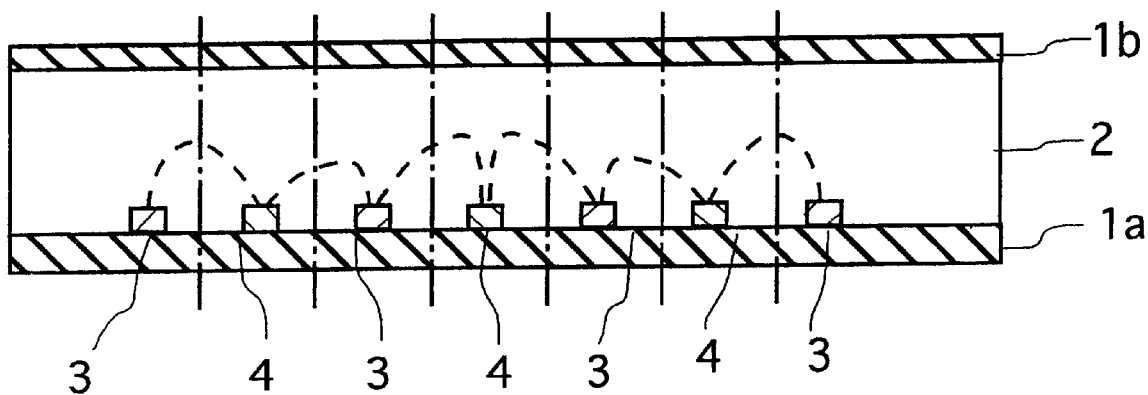
FIG. 21b is a longitudinal sectional view of a purview of the same unit.
Figure 22:
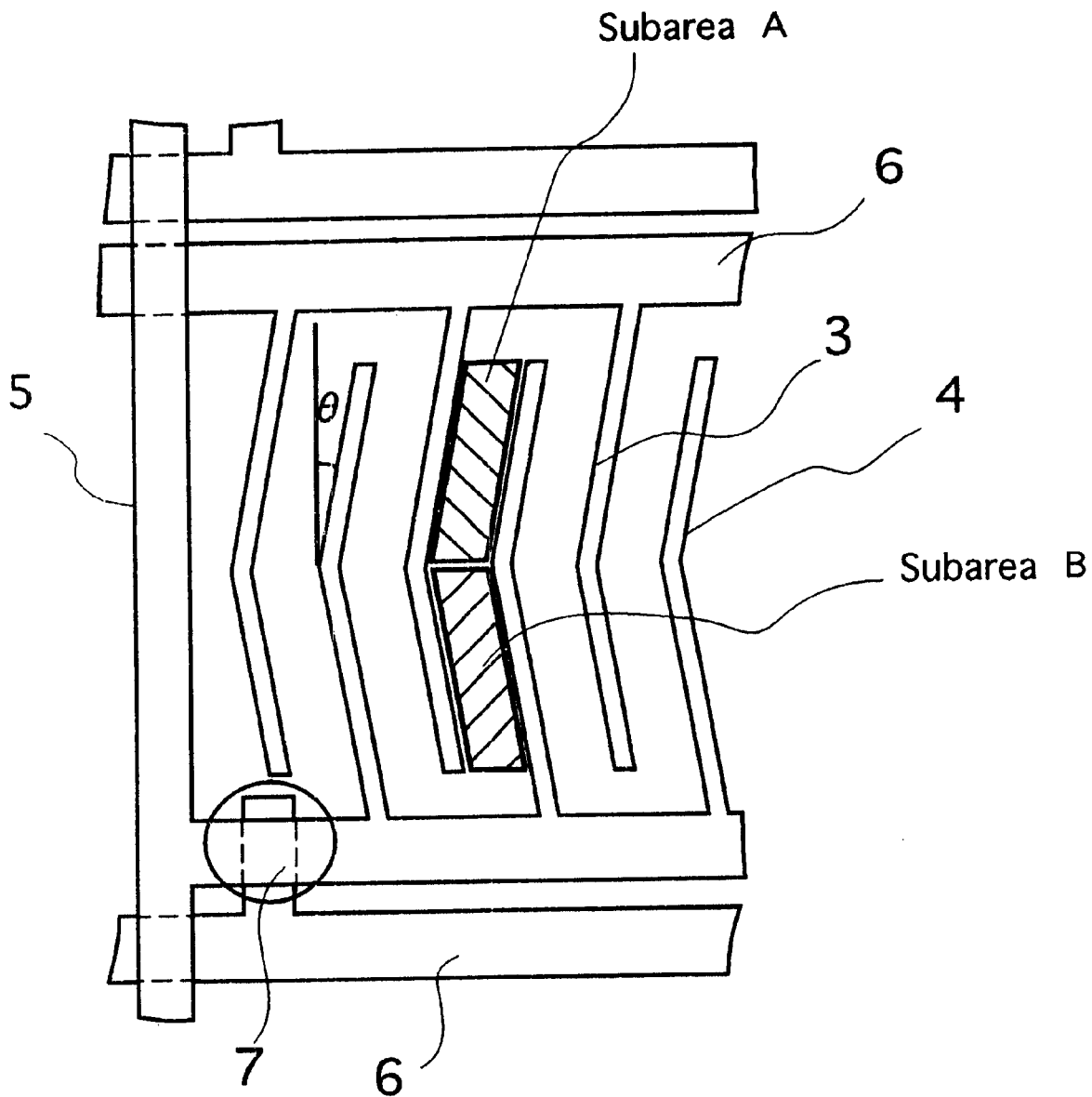
FIG. 22 is a plan view showing an example of an angular-shaped electrode used in a liquid crystal display unit.

That is, an asymmetric distribution of electric field is built up between the electrodes as shown in FIG. 21*b* in the comparative example 2 configured with the electrodes of the same width as shown in FIG. 21*a* even in the pixel without any insulating layer.

Figure 9A:
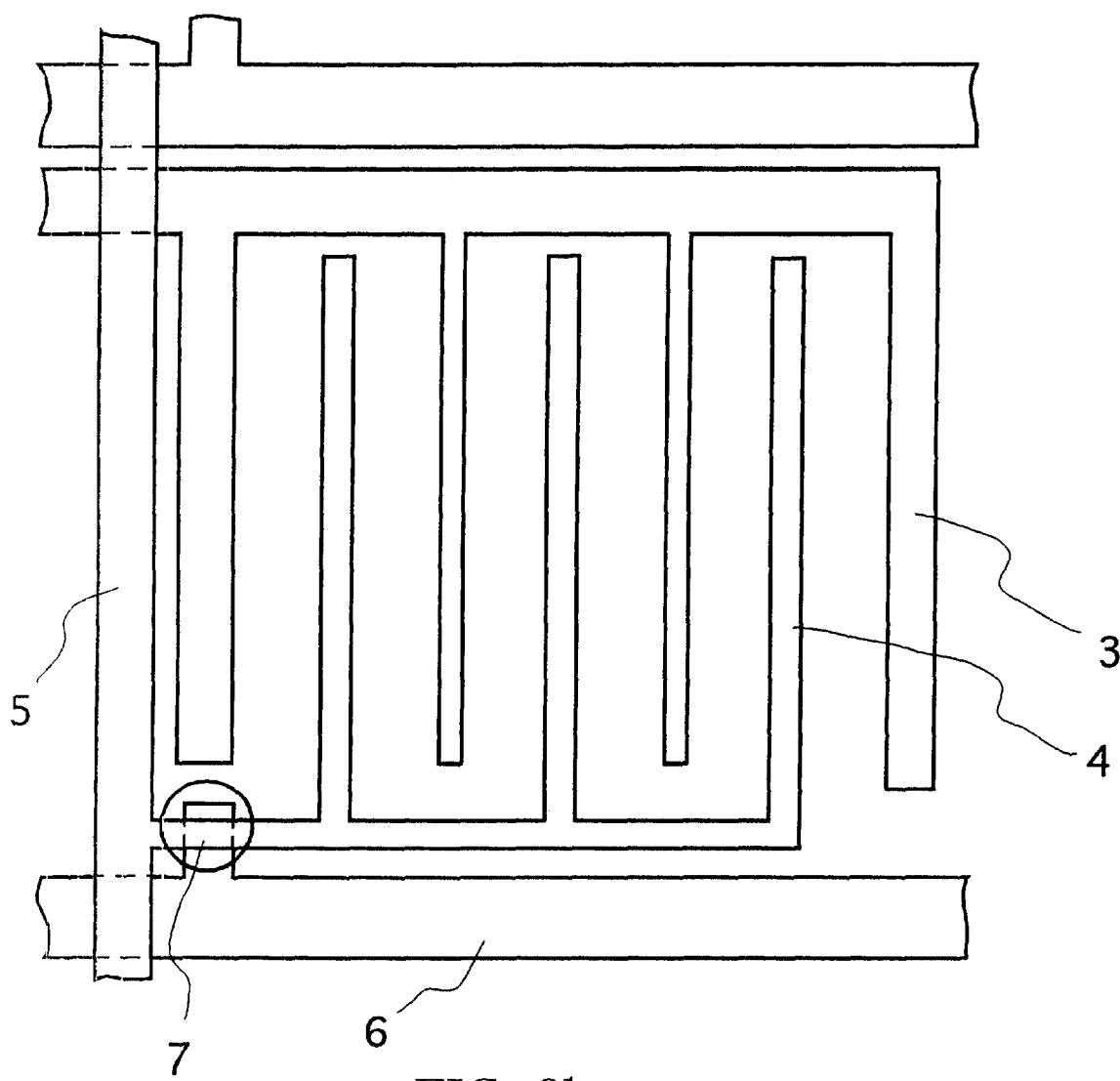
Figure 9B:
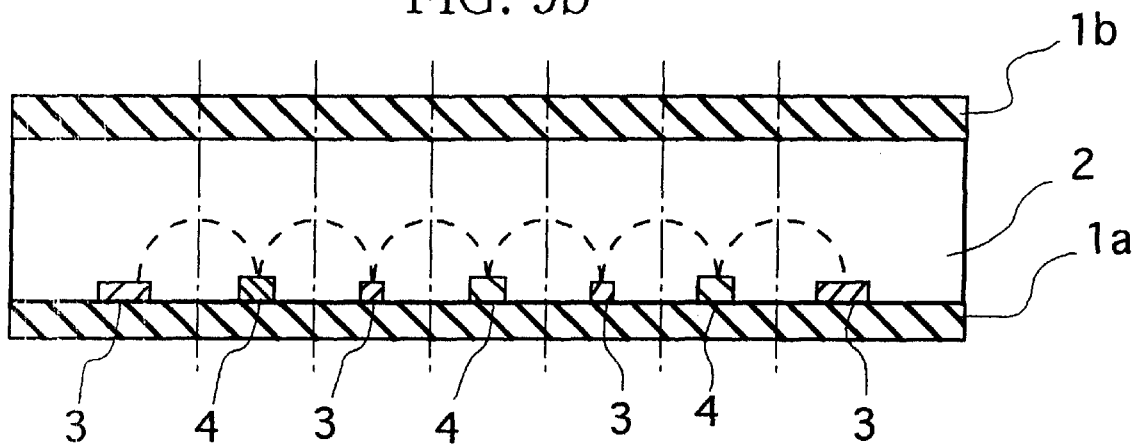
FIG. 9b is a longitudinal sectional view of a purview of the same unit.

FIG. 9*a* and FIG. 9*b* show the pixels of a liquid crystal display unit according to this embodiment. In this liquid crystal display unit, thickening electrodes near the video signal line 5 leads to suppressing an influence of the visual signal line 5 on the liquid crystal layer 2. Further, thinning the electrodes at the central portion of the pixel where the intensity of the electric field between the electrodes becomes relatively stronger will contribute to a correction of unevenness in the intensity of the electric field between the electrode pairs.

Note that the optimal width of the electrodes varies depending on the arrangement, materials, potential and so on. Therefore, these factors are not to be limited in any particular way.

The methodology to use, in the same pixel, the electrodes different in width from other electrodes as in this embodiment will be more effective if combined with another method in which the width of the common electrode is made different from that of the pixel electrode as has been described in the Embodiment 4.

EMBODIMENT 6

In this embodiment, an explanation is made on another example relating to the improvement of the asymmetry of electric field originated from a large number of the pairs of the pixel electrodes and common electrodes like the case with the Embodiment 5.

Figure 10A:
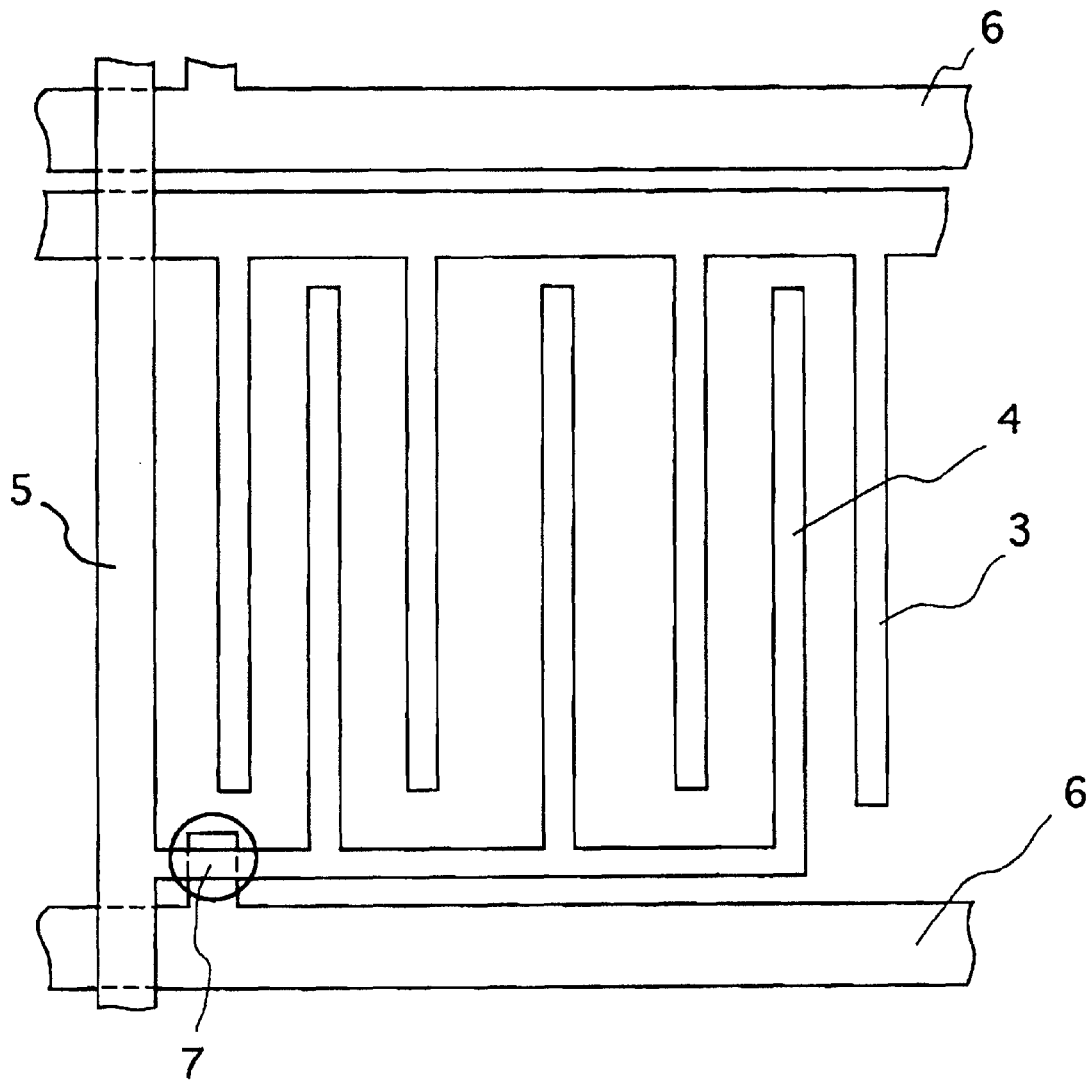
Figure 10B:
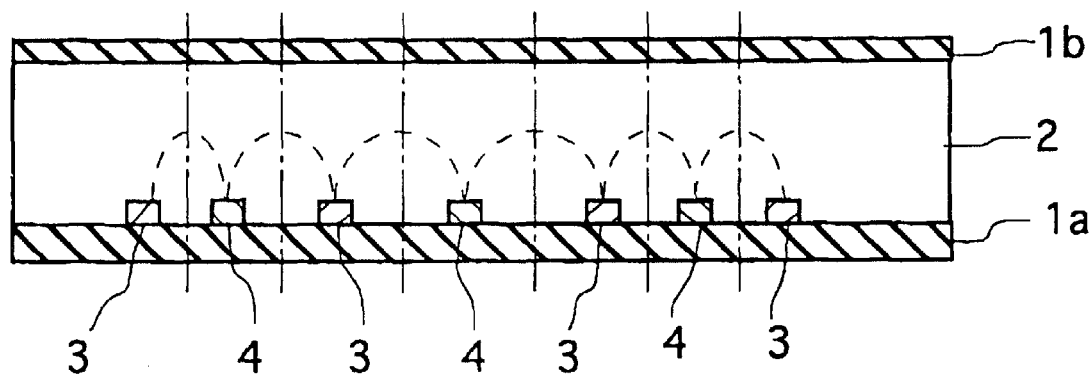
FIG. 10b is a longitudinal sectional view of a purview of the same unit.

FIG. 10*a* and FIG. 10*b* show a pixel of a liquid crystal display unit according to this embodiment.

In this embodiment, electrode pairs different in electrode gap from other electrode pairs are arranged in the same pixel. That is, making broader the gap between the electrodes of the electrode pairs at the center of pixel than that of the electrode pairs in the peripheral portion of the pixel (vicinity of source line) will contribute to more uniform distribution of the electric field formed on the respective electrode pairs.

EMBODIMENT 7

In this embodiment, description is made on an example of a liquid crystal display unit where the methods disclosed in the Embodiments 4 to 6 are combined.

Figure 11:
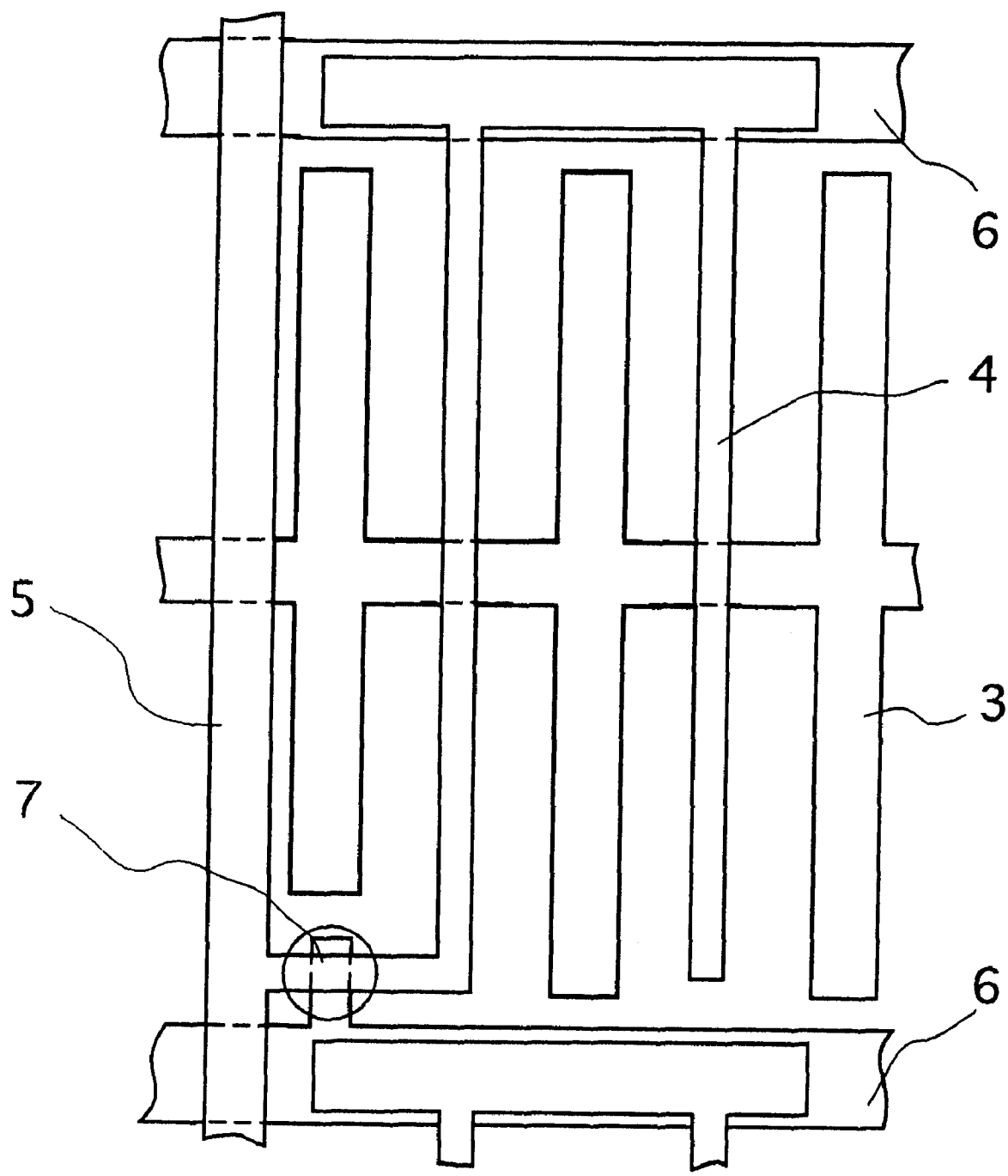
FIG. 11 is a plan view showing a purview of an array substrate of still another embodiment of a liquid crystal display unit of the present invention.

FIG. 11 shows a pixel of a liquid crystal display unit according to this embodiment. In this liquid crystal display unit, plural common electrodes 3 different in width from each other are employed, and the electrode gap at the central portion is smaller than that at the end portion. Combination of the methods disclosed in the Embodiments 4 to 6 with each other enables to suppress the image retention more effectively.

EMBODIMENT 8

In this embodiment, description is made on the liquid crystal display unit employing so-called angular-shaped electrodes, in addition to the methods disclosed in the Embodiments 4 to 6. In any of the above-described embodiments, common electrodes 3 and pixel electrodes 4 of the linear shape is employed.

Figure 12:
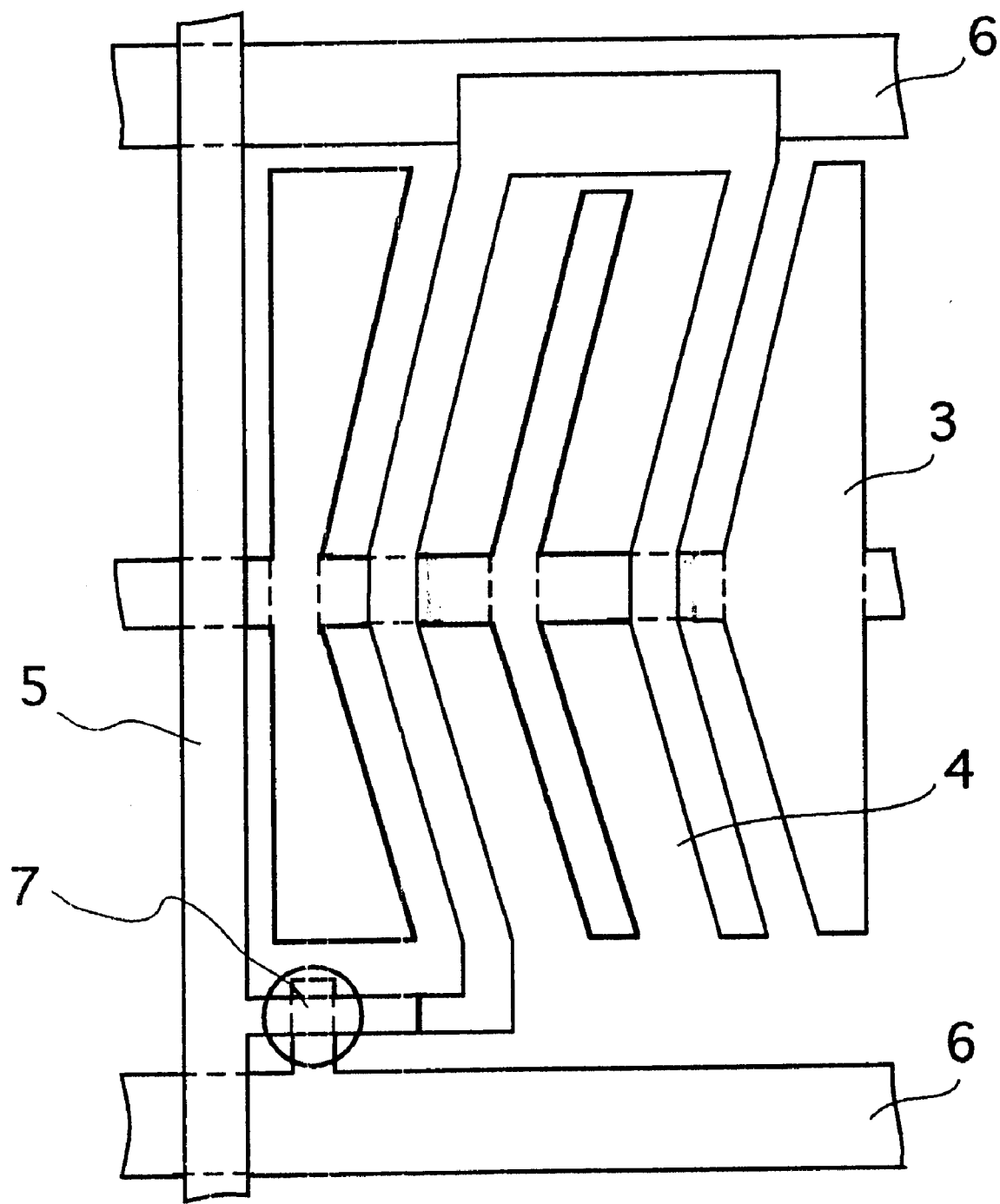
FIG. 12 is a plan view showing a purview of an array substrate of yet another embodiment of a liquid crystal display unit of the present invention.

FIG. 12 illustrates a pixel of the liquid crystal display unit according to this embodiment. In this liquid crystal display unit, common electrodes 3 and pixel electrodes 4 both of which having the bent portions are used. Such a combination with the angular-shaped electrodes could decrease the coloring due to viewing angle, thereby allowing to actualize a liquid crystal display unit with little image retention.

EMBODIMENT 9

In this embodiment, a description is made on an example with electrode pairs with common and pixel electrodes of which thicknesses are different from each other.

Figure 13A:
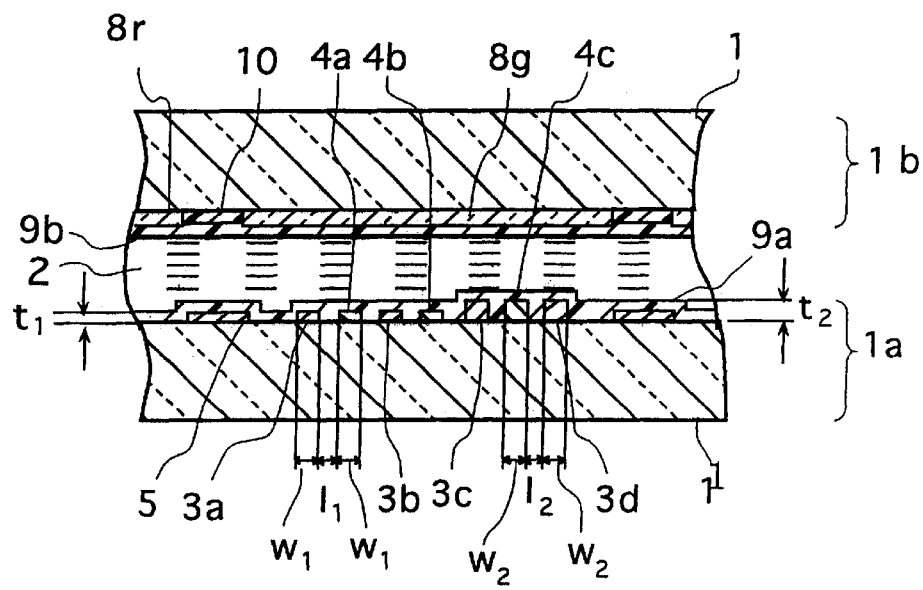
Figure 13B:
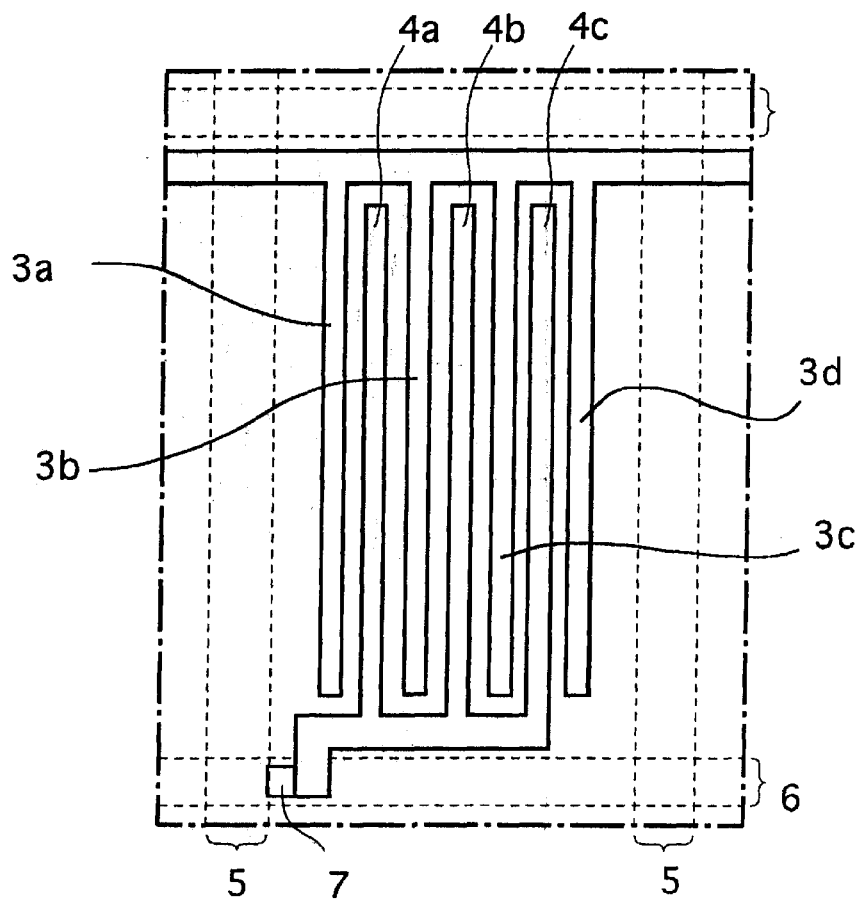
FIG. 13b is a plan view of a purview of an array substrate of the same unit.

FIG. 13*a* and FIG. 13*b* show purviews of a liquid crystal display unit of this embodiment.

In this embodiment, electrode pairs consisting of common electrode 3*a* or 3*b* and pixel electrode 4*a* or 4*b* hereinafter referred to as "electrode pair F") and electrode pair composed of the common electrode 3*c* or 3*d* and pixel electrode 4*d* (hereinafter referred to as "electrode pair G") are set as shown in Table 3 below.

TABLE 3

| Electrode Pair | Gap (μm) | Width (μm) | Thickness (Å) | Cell gap (μm) |
| --- | --- | --- | --- | --- |
| F | 10 | 6 | 2,000 | 4 |
| G | 6 | 10 | 8,000 | |

As shown above, the geometrical shape of the distribution of the electric field formed between the electrodes also varies depending on the thickness of the electrodes like the case where electrode width or gap differs. Therefore, the director revealed by the liquid crystal molecule in that area also varies depending on the thickness of the electrodes. The coexistence, as above described, of the electrode pairs different in width from each other in the same pixel reveals the wavelength dispersion characteristics (that is, coloring characteristic) which are different from each other in each area. Therefore, such a configuration makes it possible to cancel the coloring in each area, thereby enabling to realize a liquid crystal display unit with a high picture quality and little coloring due to any change in viewing angle direction.

Furthermore, it should be noted that the use of thick electrode pairs such as electrode pair G, of which thickness is 8,000 Å, makes a response time thereof shorter than the electrode pair F with general thickness of approximately 2,000 Å.

Since the liquid crystal molecule of the electrode pair F behaves as if to follow the liquid crystal molecule of the fast-responding electrode pair G, the pixel, where the electrode pairs F and G coexist, can feature faster response than the pixel of intermediate configuration, for example, between the electrode pairs F and G, that is, the configuration where all the electrodes consist only of the electrode pairs of 5,000 Å.

This embodiment therefore enables to realize a fast-responding liquid crystal display unit that can maintain a high picture quality even with the display of moving pictures.

EMBODIMENT 10

Figure 14A:
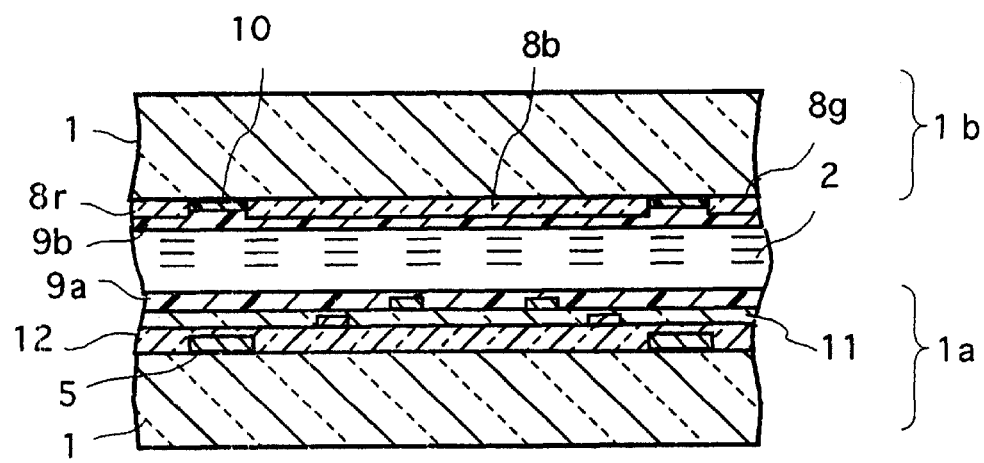
Figure 14B:
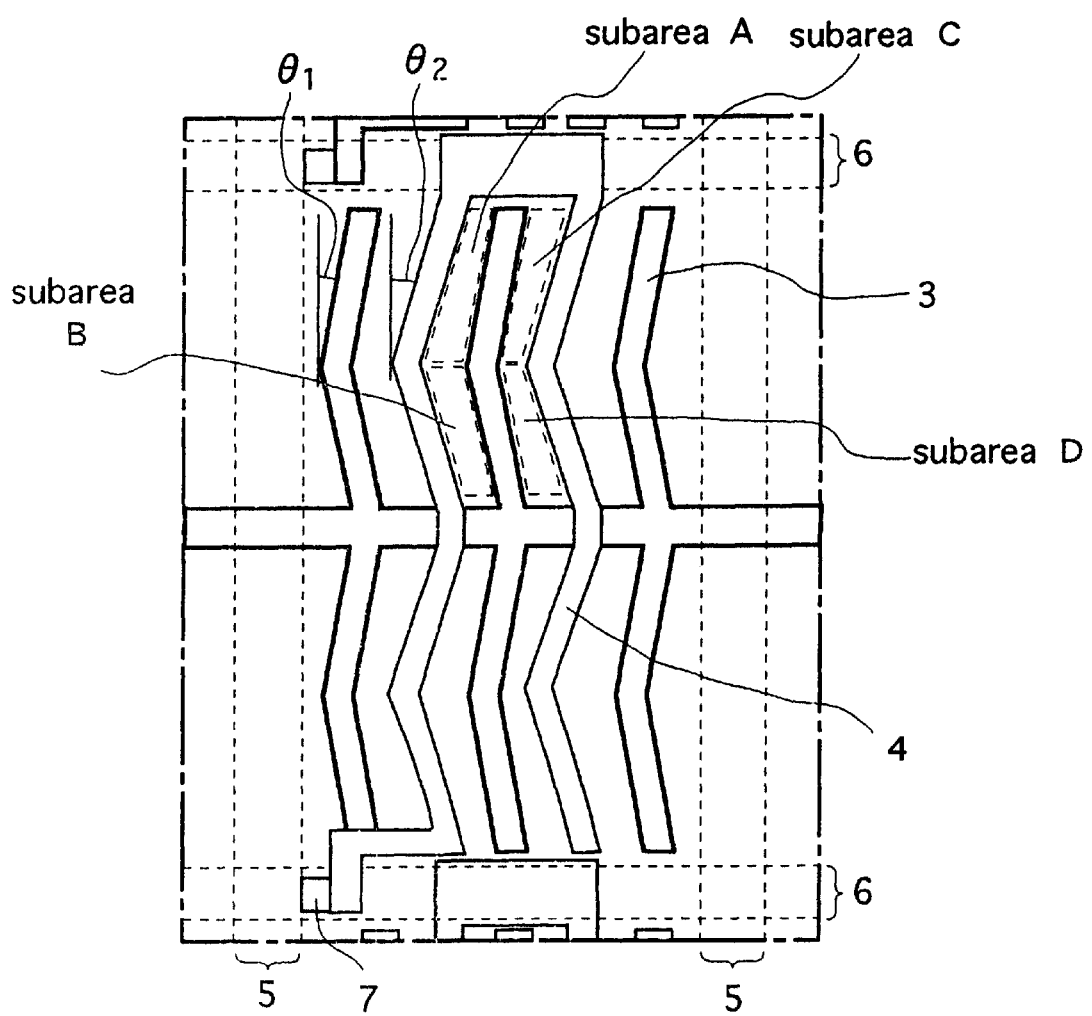
FIG. 14b is a plan view of a purview of an array substrate of the same unit.

In this embodiment, a description is made on an example in which so-called angular-shaped electrodes are employed. FIG. 14a and FIG. 14b show purviews of a pixel of a liquid crystal display unit according to this embodiment.

Both a common electrode 3 and pixel electrode 4 are angular-shaped electrodes having a partially curved or bent structure. Angle of bend $\theta_1$ of the common electrode 3 differs from the angle of bend $\theta_2$ of the pixel electrode 4. For example, the angle of bend $\theta_1$ of the common electrode 3 is set to 15°, and the angle of bend $\theta_2$ of the pixel electrode 4 to 20°. If the angles of bend are different between these two electrodes, an electrode gap will differ according to each site. The geometrical shape of an electric field formed in the subarea as shown by "A" in the figure differs from that formed in the subarea "B". Similarly, the electric field distribution characteristics in the subareas A, B, C, and D differ from each other. Consequently, the liquid crystal molecules in respective subareas show the directors different from each other, and the respective subareas show the wavelength dispersion characteristics (that is, coloring features) different from each other.

According to this embodiment, being divided into the four subareas, it consequently becomes possible to reduce a variation in chromaticity more effectively than in the Embodiment 7.

Provided however that too much difference in the angle of bend $\Delta\theta$ (=$\theta_1$-$\theta_2$) may produce some sites with extremely large electrode gap, and some others with extremely small gap. Such an extreme difference in the electrode gap may lead to a large difference in optical response characteristic, thereby causing the occurrence of flicker. Therefore, it is desirable to reduce the differential angle of bend $\Delta\theta$ to ±10° or less.

The larger the angle of bend of the electrode (common electrode 3 in this embodiment) nearer to the video signal line 5, the more the area of the region without any modulation of the liquid crystal molecule increases, and the more the substantial aperture ratio decreases. Therefore, it is more desirable to have a configuration where the angle of bend of the electrode near to the video signal line 5 is reduced as far as possible, and that of another electrode is increased as much as possible.

EMBODIMENT 11

In this embodiment, an explanation is made on an example where the respective colors of R, G, and B are adjusted by controlling the wavelength dispersion characteristic.

Figure 15A:
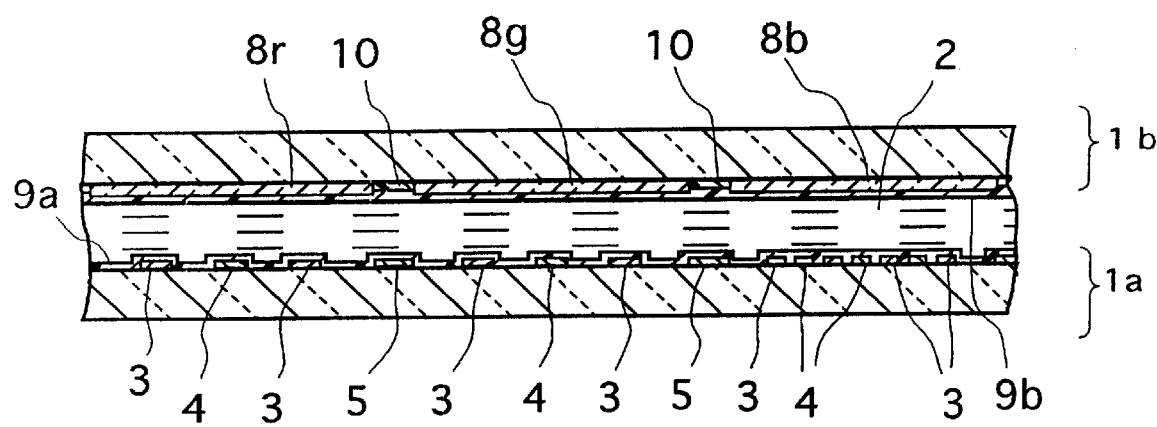
Figure 15B:
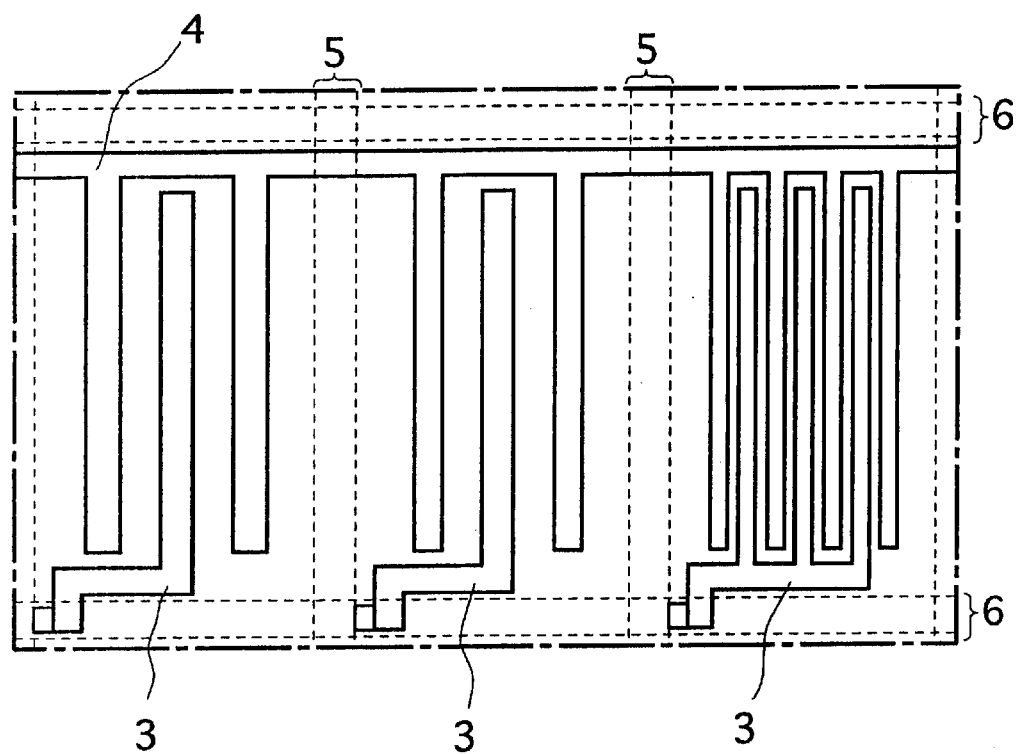
FIG. 15b is a plan view of a purview of an array substrate of the same unit.

FIG. 15a and FIG. 15b show the purview of a liquid crystal display unit according to this embodiment.

As has been described in the preceding embodiment, a different electrode gap, electrode width, or electrode thickness will result in different distribution of an electric field formed on the electrode pair, thereby leading to different wavelength dispersion characteristics.

Figure 19:
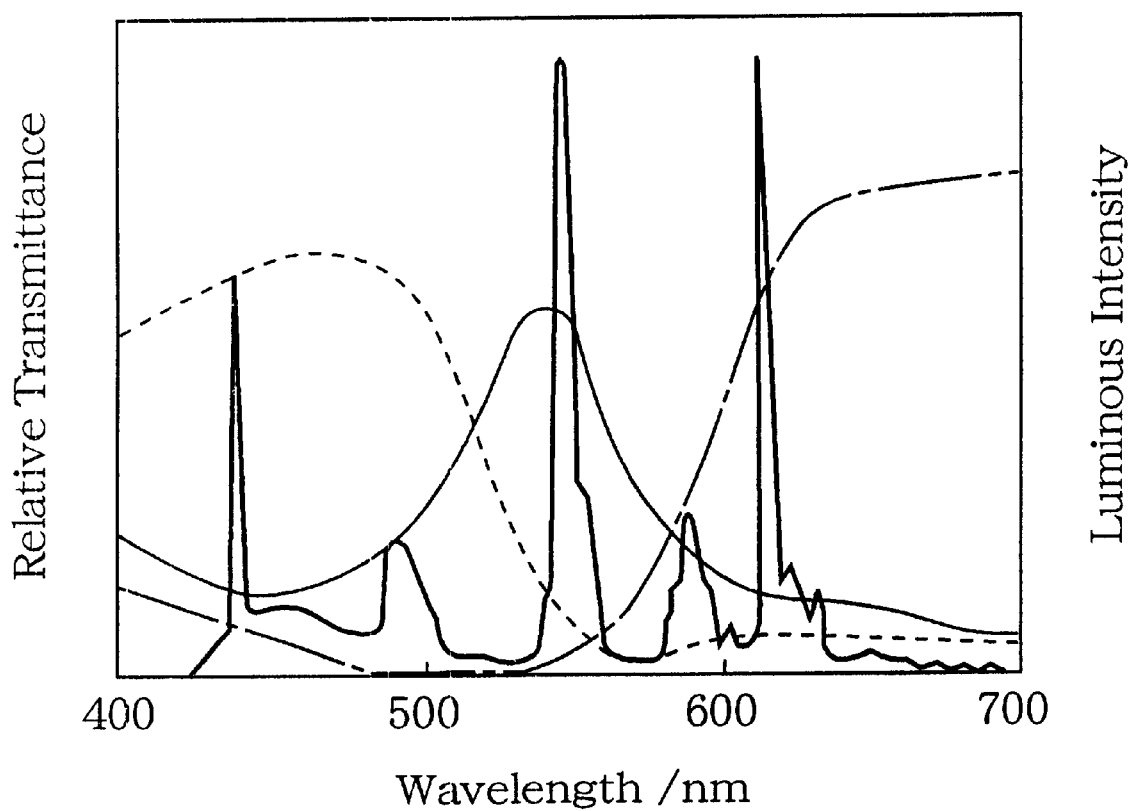
FIG. 19 is a characteristic diagram showing transmittance of color filter and a wavelength distribution of backlight.

As shown in FIG. 19, the color filters of respective colors R, G, and B have their own wavelength characteristics, and the peak transmittance may in general be obtained near 700 nm for R, near 550 nm for G, and near 440 nm for B, respectively.

As has previously be shown in FIG. 2, the peak transmittance at the wavelength of approximately 550 nm can be obtained with the electrode pair "A" with 10 µm of electrode gap and 6 µm of electrode width, while the peak transmittance at the wavelength of approximately 480 nm can be obtained with the electrode pair "B" with 4 µm of electrode gap and 4 µm of electrode width.

Consequently, the light use efficiency can be maximal if the electrode pair of the same configuration as the electrode pair "A" is used for the pixel of green color filter 8g, and the electrode pair of the same configuration as the electrode pair "B" is used for the pixel of blue color filter 8b. Similarly, an electrode pair of such configuration as having 700 nm of the peak transmittance under the same conditions may be used for the pixel of red color filter 8r.

Like this, use of the electrode pairs different in the electrode width or electrode gap in accordance with respective colors will give high use efficiency and high luminance. Further, since the directors of liquid crystal molecules varies depending on the pixels, the coloring can cancel each other out to give a high picture quality liquid crystal display unit with little coloring due to the change in viewing angle direction.

Use of the angular-shaped electrodes as in this embodiment will be more effective against the problem of coloring.

EMBODIMENT 12

In this embodiment, a description is made on an exemplary method in which the respective colors of R, G, and B are adjusted using the angular-shaped electrodes and the electrode pairs different in their angle of bend θ for the respective pixels of R, G, and B.

Figure 16A:
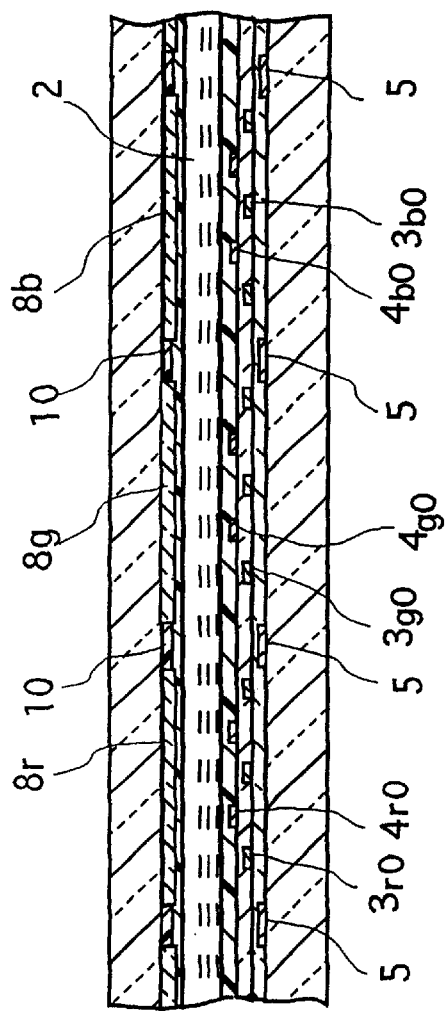
Figure 16B:
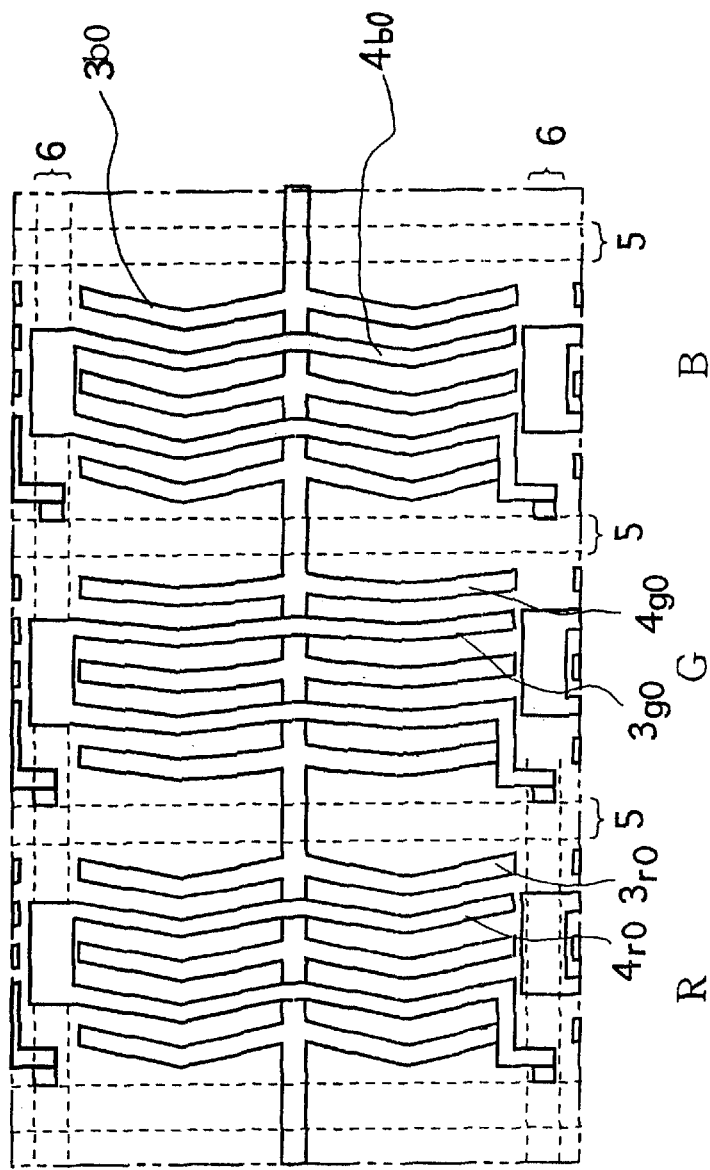
FIG. 16b is a plan view of a purview of an array substrate of the same unit.

FIG. 16a and FIG. 16b show a purview of a liquid crystal display unit according to this embodiment.

In the electrode configuration as seen in this embodiment, a variation in chromaticity due to viewing angle is the greatest in red (R). The larger the angle of bend θ, the more the area of pixel portion of which liquid crystal molecule does not modulate increases, and the more the substantial aperture ratio decreases. In consequence, the angle of bend $\theta_r$ of the electrodes $3_{r0}$ and $4_{r0}$ at the red pixel should be larger than the angle of bend $\theta_g$ of the electrodes $3_{g0}$ and $4_{g0}$ at the green pixel and the angle of bend $\theta_b$ of electrodes $3_{b0}$ and $4_{b0}$ at the blue pixel.

EMBODIMENT 13

In this embodiment, a description is made on an exemplary method in which the respective colors of R, G and B are adjusted by altering the thickness of the electrodes for respective pixels of R, G, and B.

Figure 17:
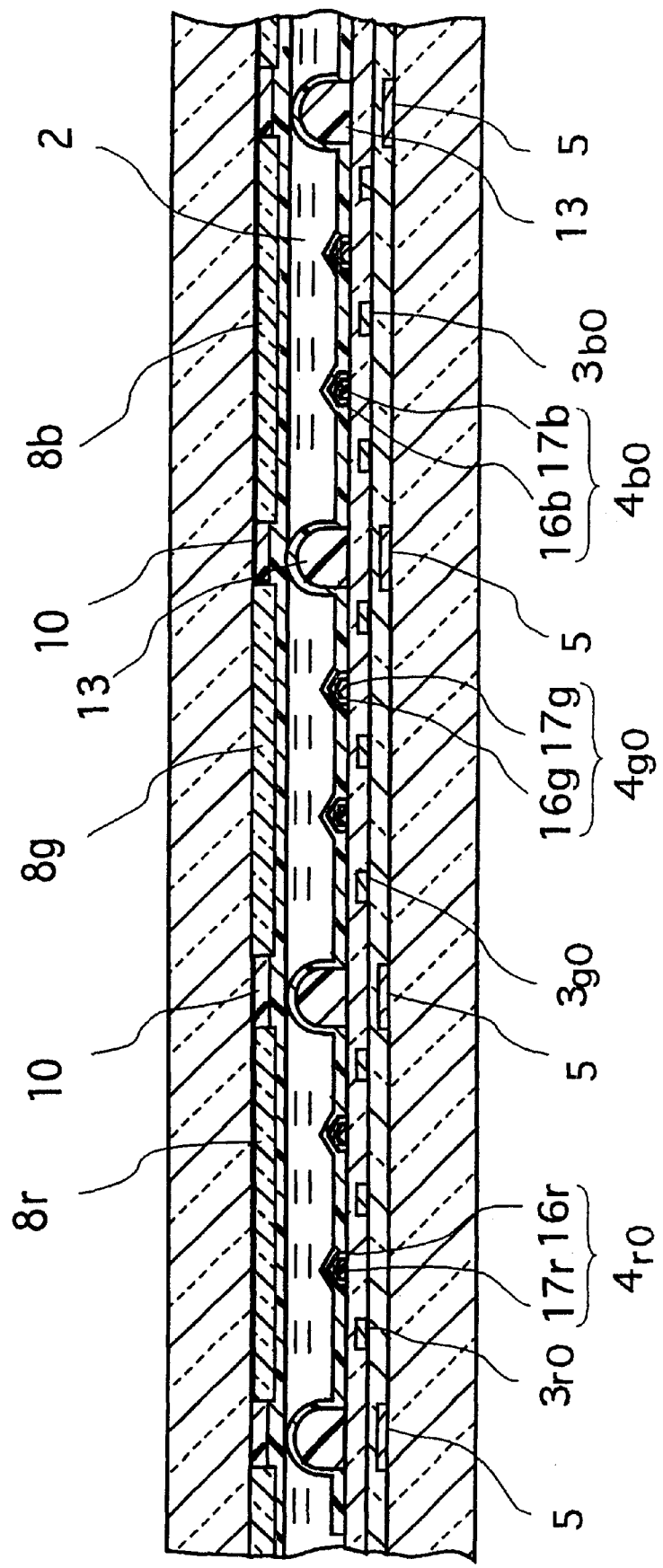
FIG. 17 is a longitudinal sectional view showing a purview of still another embodiment of a liquid crystal display unit of the present invention.

FIG. 17 shows a purview of a liquid crystal display unit according to this embodiment. A pixel electrode of this pixel consists of a linear transparent insulating layer and a transparent conductive layer of which its upper and lateral faces are coated. A pixel electrode $4_{b0}$ of blue pixel consists of a transparent conductive layer 16b and transparent insulating layer 17b, while a pixel electrode $4_{g0}$ of blue pixel consists of a transparent conductive layer 16g and transparent insulating layer 17g. A pixel electrode $4_{r0}$ of red pixel consists of a transparent conductive layer 16r and transparent insulating layer 17r. The thickness of the pixel electrodes $4_{b0}$, $4_{g0}$ and $4_{r0}$ is controlled by the thickness of the transparent insulating layers 17b, 17g, and 17r respectively.

An employment of the electrodes of which thickness is different according to each display color will give an effect similar to the Embodiment 11 where the electrode pairs different in electrode width and electrode gap are employed according to respective display colors. Since, in this case, the light use efficiency and luminance is high enough, and further, directors of the liquid crystal molecule are different according to each pixel, the configuration allows the coloring to be canceled each other, thereby reducing the coloring due to the change in viewing angle direction.

Further, in this embodiment, a thickness-controlling member 13 is provided in place of the conventional spacer on the surface of the array substrate 1a to maintain a liquid crystal cell gap "d" constant.

The thickness-controlling member 13 consisting of, for example, the same material as that of the transparent insulating layers 17b, 17g, and 17r, is formed on the side of the array substrate 1a at the same time in the forming process of the transparent insulating layers 17b, 17g, and 17r.

Since this thickness-controlling member 13 enables to control the cell gap "d" without using any spacer, we can remove a reduced contrast by light leak from the spacer, and a flaw of the spacer by its displacement, thereby enabling to realize a high contrast, and highly reliable liquid crystal display unit.

Figure 18:
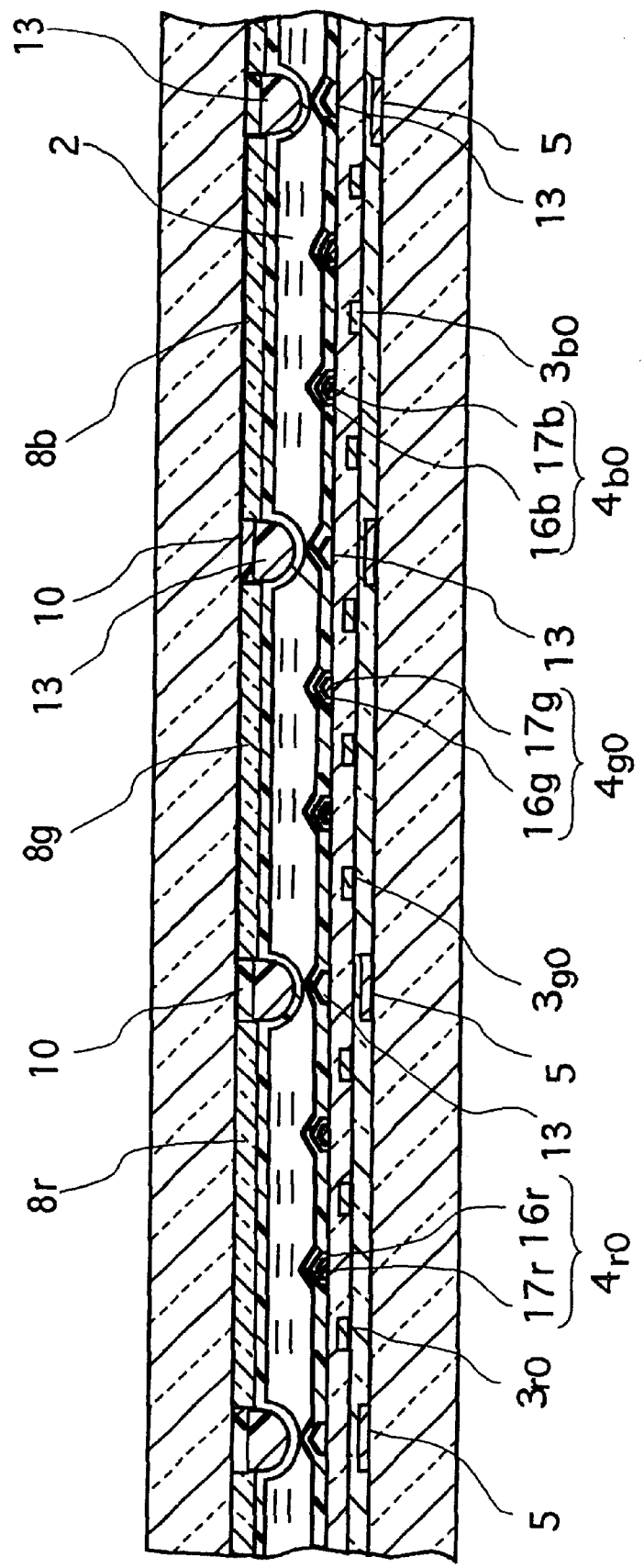
FIG. 18 is a longitudinal sectional view showing a purview of yet another embodiment of a liquid crystal display unit of the present invention.

As shown in FIG. 18, such thickness-controlling member as above described may be formed on the counter substrate 1b. In this case, the member is made of the same material with a black matrix 10, and is formed as integrated with the black matrix 10.

What is claimed is:

1. A liquid crystal display unit comprising:
   a plurality of pixels each including a plurality of common electrodes, a plurality of pixel electrodes, and a semiconductor switching element;
   a plurality of scanning signal lines;
   a plurality of video signal lines for outputting signals to the pixel electrodes;
   an array substrate having the pixels, the scanning signal lines, and the video signal lines arranged on a surface thereof;
   a counter substrate arranged opposite the array substrate; and
   a liquid crystal layer sandwiched between the array substrate and the counter substrate, wherein
      each of the pixels includes a plurality of electrode pairs, each electrode pair comprising one of the common electrodes and an adjacent one of the pixel electrodes, and
      at least one of the electrode pairs differs from other electrode pairs in a thickness of its common electrode or a thickness of its pixel electrode.

2. The liquid crystal display unit in accordance with claim 1, wherein each of the common electrodes or each of the pixel electrodes includes a layer of transparent insulator and a film of transparent conductor, the film covering a surface of the layer of transparent insulator.

3. The liquid crystal display unit in accordance with claim 2, further comprising a thickness-controlling member for controlling a thickness of the liquid crystal layer, wherein said thickness-controlling member and the transparent insulator layer are integral portions of the same material.

4. A liquid crystal display unit comprising:
   a plurality of pixels each including a plurality of common electrodes, a plurality of pixel electrodes, and a semiconductor switching element;
   a plurality of scanning signal lines;
   a plurality of video signal lines for outputting signals to the pixel electrodes;
   an array substrate having the pixels, the scanning signal lines, and the video signal lines arranged on a surface thereof;
   a counter substrate arranged opposite the array substrate; and
   a liquid crystal layer sandwiched between the array substrate and the counter substrate, wherein
      each of the common and pixel electrodes comprises an angular-shaped portion, and
      at least one of the electrodes has a first angle of bend in the angular-shaped portion and other electrodes in the same pixel have a second angle of bend in the angular-shaped portion.

5. The liquid crystal display unit in accordance with claim 4, wherein an angle of bend of an angular-shaped portion of one of the electrodes is smaller than that of other electrodes in the same pixel, the one of the electrodes being adjacent to one of the video signal lines.

6. The liquid crystal display unit in accordance with claim 4, wherein:
   each of the common electrodes comprises an angular-shaped portion having a first angle of bend;
   each of the pixel electrodes comprises an angular-shaped portion having a second angle of bend; and
   an absolute value of a difference between the first angle of bend and the second angle of bend is 0 to 10 degrees.

7. A liquid crystal display unit comprising:
   a plurality of pixels each including a plurality of common electrodes, a plurality of pixel electrodes, and a semiconductor switching element;
   a plurality of scanning signal lines;
   a plurality of video signal lines for outputting signals to the pixel electrodes;

an array substrate having the pixels, the scanning signal lines, and the video signal lines arranged on a surface thereof;

a counter substrate arranged opposite the array substrate; and a liquid crystal layer sandwiched between the array substrate and the counter substrate, wherein the pixels include a pixel for red color display and a pixel for displaying a color different than that displayed by the pixel for red color display;

the pixel for red color display comprises common and pixel electrodes, each comprising an angular-shaped portion and having substantially identical bend angles; and the pixel for other color display comprises common and pixel electrodes, each comprising an angular-shaped portion having a smaller angle of bend than the electrodes of the pixel for red color display.

* * * * *

UNITED STATES PATENT AND TRADEMARK OFFICE
CERTIFICATE OF CORRECTION

PATENT NO.      : 6,525,798 B1
DATED           : February 25, 2003
INVENTOR(S)     : Hiroyuki Yamakita et al.

It is certified that error appears in the above-identified patent and that said Letters Patent is hereby corrected as shown below:

<u>Title page,</u>
Item [56], U.S. PATENT DOCUMENTS, please insert the following:

-- 4,345,249    8/1982    Togashi. . . . . . . . . . . . . 340/784 --.

Signed and Sealed this

Sixteenth Day of September, 2003

JAMES E. ROGAN
*Director of the United States Patent and Trademark Office*